(12) United States Patent
Sato et al.

(10) Patent No.: US 10,162,530 B2
(45) Date of Patent: Dec. 25, 2018

(54) COMPUTER AND COMPUTER SYSTEM FOR COLLISION DETERMINATION OF A COMMAND IDENTIFIER

(71) Applicant: Hitachi, Ltd., Tokyo (JP)

(72) Inventors: Katsuto Sato, Tokyo (JP); Yuki Kondoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 15/126,672

(22) PCT Filed: Sep. 18, 2014

(86) PCT No.: PCT/JP2014/074684
§ 371 (c)(1),
(2) Date: Sep. 16, 2016

(87) PCT Pub. No.: WO2016/042635
PCT Pub. Date: Mar. 24, 2016

(65) Prior Publication Data
US 2017/0090756 A1    Mar. 30, 2017

(51) Int. Cl.
*G06F 3/06*    (2006.01)

(52) U.S. Cl.
CPC .............. *G06F 3/061* (2013.01); *G06F 3/067* (2013.01); *G06F 3/0619* (2013.01); *G06F 3/0659* (2013.01); *G06F 3/0689* (2013.01)

(58) Field of Classification Search
CPC ......... G06F 3/061; G06F 3/0659; G06F 3/067
See application file for complete search history.

(56) References Cited

U.S. PATENT DOCUMENTS

| | | | |
|---|---|---|---|
| 6,467,032 B1 * | 10/2002 | Lippert | G06F 13/161 711/150 |
| 6,490,636 B1 | 12/2002 | Kikuchi et al. | |
| 6,526,484 B1 * | 2/2003 | Stacovsky | G06F 13/1626 710/39 |
| 8,321,871 B1 | 11/2012 | Jackson | |
| 2004/0081082 A1 | 4/2004 | Moody, II et al. | |
| 2004/0127211 A1 | 7/2004 | Wary | |
| 2005/0174547 A1 | 8/2005 | Yamaguchi et al. | |
| 2012/0005391 A1 | 1/2012 | Byrne et al. | |

FOREIGN PATENT DOCUMENTS

| | | |
|---|---|---|
| EP | 0992907 A2 | 4/2000 |
| JP | 2005-339134 A | 12/2005 |

OTHER PUBLICATIONS

International Search Report of PCT/JP2014/074684 dated Dec. 22, 2014.

* cited by examiner

*Primary Examiner* — Glenn A. Auve
(74) *Attorney, Agent, or Firm* — Mattingly & Malur, PC

(57) ABSTRACT

A computer coupled to an external apparatus via an I/O device comprising, a control unit configured to assign a command identifier to a command issued to the external apparatus, wherein the I/O device includes a collision detection unit defined a partial command identifier space which is a subspace of a command identifier space that is a set of a plurality of command identifiers, and wherein the collision detection unit is configured to: shift an arrangement of the partial command identifier space within the command identifier space; and determine whether or not the assigned command identifier collides with another command identifier that is in use.

2 Claims, 18 Drawing Sheets

COMPUTER AND COMPUTER SYSTEM FOR COLLISION DETERMINATION OF A COMMAND IDENTIFIER

TECHNICAL FIELD

The present invention relates to an I/O device configured to detect a collision of a command identifier assigned to a command issued by a processor.

BACKGROUND OF THE INVENTION

An OS (Operating System) that operates in a computer transmits data, which may be referred to as a command, generated based on a predetermined set of rules in a case where it sends an instruction to perform a predetermined task to an I/O device coupled to the computer.

A high performance I/O device uses a method of command execution called an "out of order" execution. With the out of order execution, the I/O device may execute a process with respect to a command in an order that is different from the order the command was received, and notify the completion of the process to the OS.

With the out of order execution method, the OS in general assigns a command identifier to the command in order to determine a command that corresponds to the completion of the process, and assigns a command identifier to the notification for completing the process as well.

In a case a command identifier collides with another command identifier in a command group that is being executed, the OS may not be able to determine which command has been completed, and this may prevent a normal I/O process from being completed. Accordingly, the OS on the side of issuing commands may include a function to prevent the collided command identifiers from being assigned.

A conventional I/O device trusts that a command identifier that is assigned to a received command is unique, and uses the command identifier without determining whether or not the command identifier collided with another. However, in order to achieve higher reliability of the I/O processing, there is a demand to confirm whether or not command identifiers collide with another on the I/O devices.

For example, when generating an identifier, a well-known technique to examine whether or not the identifier collides with another would narrow identifiers that are reasonably believed to be comparable based on time information, and examine whether or not they collide (for example, see Japanese Patent Application Laid-open Publication No. 2005-339134 A).

SUMMARY

In a case where a computer, in which an OS operates, executes a process to confirm whether or not a command identifier is unique, there would be no major performance problem because the computer has sufficient computer resource to execute such process. Also, an OS is, by assigning command identifiers based on a predetermined set of rules, operable to reduce the load on the computer and achieve assigning unique command identifiers.

On the other hand, the I/O device is not operable to control the rule of assigning method of command identifiers and has limited computer resource, therefore, due to its capacity and circuit size of the I/O device, it is necessary to effectively confirm the uniqueness of the command identifiers.

For example, the computer on the side of issuing commands is operable to control by using time information as disclosed in Japanese Patent Application Laid-open Publication No. 2005-339134 A. However, the I/O device is unable to rely on clues such time information included in command identifiers.

On the other hand, computer resources that are necessary to manage command identifiers being executed by using a chart increase in proportion to the length of the command identifiers, the number of commands (hereinafter, referred to as multiplicity) that are simultaneously executable. The I/O device that uses input/output protocols having large length of the command identifiers requires tremendously large computer resource in order to detect the collision of command identifiers in a case of being increased multiplicity to provide high I/O performance.

The present invention provides a device having a function to detect the collision of command identifiers by using limited computer resource under the situation such as ones described above.

Solutions to Problems

The present invention can be appreciated by the description which follows in conjunction with the following figures, wherein: a computer coupled to an external apparatus via an I/O device comprises a control unit configured to assign a command identifier to a command issued to the external apparatus. The I/O device includes a collision detection unit defined a partial command identifier space which is a subspace of a command identifier space that is a set of a plurality of command identifiers. The collision detection unit is configured to shift an arrangement of the partial command identifier space within the command identifier space, and determine whether or not the assigned command identifier collides with another command identifier that is in use.

Effects of the Invention

According to one embodiment of the present invention, the I/O device detects the collision of command identifiers that are included in the partial command identifier space while shifting the arrangement of the partial command identifier space within the command identifier space. Accordingly, the I/O device is operable to detect the collision of all command identifiers included in the command identifier space while using limited computer resources and while reducing the decrease of I/O process performance.

Other objects, configurations, and effects than those described above are revealed through the following description of embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, embodiments of the present invention will be described with reference to accompanying drawings.

First Embodiment

Figure 1:
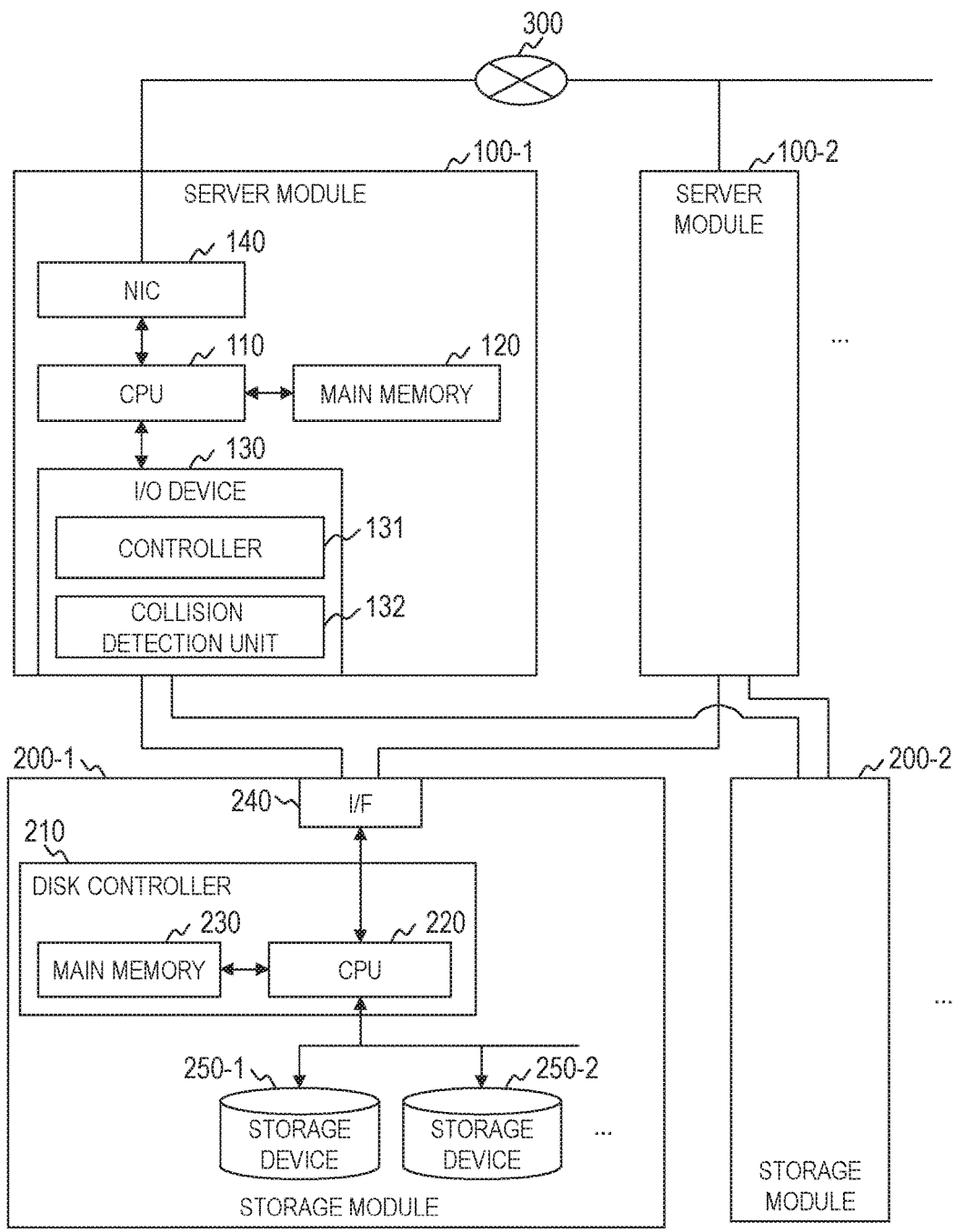
FIG. 1 is a block diagram illustrating an example of a configuration of a computer system according to a first embodiment.

FIG. 1 is a block diagram illustrating an example of a configuration of a computer system according to a first embodiment.

The computer system of the first embodiment includes a plurality of server modules 100, and a plurality of storage modules 200. Each server module 100 is coupled to a management network 300.

The server module 100 is a computer configured to execute a predetermined operation. The storage module 200 is a computer configured to store therein data used by the server module 100. According to the first embodiment, the storage module 200 provides a storage area for each server module 100. According to the first embodiment, an LU (Logical Unit) will be provided as the storage area.

The server module 100 includes a CPU 110, a main memory 120, an I/O device 130 and an NIC 140. Each component included in the server module 100 is coupled to one another via an internal bus.

The CPU 110 executes a program stored in the main memory device 120. By executing a program stored in the main memory 120, the functions of the server module 100 is implemented.

The main memory 120 stores therein a program executed by the CPU 110 and information necessary for executing the program. The main memory 120 of first embodiment stores therein a program for implementing an OS (Operating System) 400 (see FIG. 2). The main memory 120 may store therein an application program, or the like, other than said program for implementing the OS 400 (see FIG. 2).

Note that the program and the information stored in the main memory 120 may be stored in the LU provided by the storage module 200. In this case, the CPU 110 obtains the program and the information from the LU, and loads the obtained program and the obtained information to the main memory 120.

The I/O device 130 is an interface for coupling to an external apparatus. According to first embodiment, the server module 100 is coupled to the storage module 200 via the I/O device 130.

The I/O device 130 of the first embodiment includes a controller 131 and a collision detection unit 132. The controller 131 controls the entire I/O device 130. The collision detection unit 132 determines whether or not a command identifier 501 (see FIG. 4A) assigned to command data 500 (see FIG. 3A), which is issued by the OS 400 (see FIG. 2), collides with another.

The NIC 140 is an interface for coupling to an external apparatus via a network such as LAN (Local Area Network).

The storage module 200 includes a disk controller 210, an I/F 240 and a plurality of storage devices 250. Each component included in the storage module 200 is coupled to one another via an internal bus.

The disk controller 210 manages the storage area and controls the correspondence, or the like, between the server module 100 and the storage area. The disk controller 210 includes a CPU 220 and a main memory 230. Note that the storage module 200 may include multiple disk controllers 210 so as to improve fault tolerance thereof.

The CPU 220 executes a program stored in the main memory 230. By executing a program stored in the main memory 230, the functions of the storage module 200 is implemented.

The main memory 230 stores therein a program executed by the CPU 220 and information necessary for executing the program. The main memory 230 stores therein a program for implementing a storage control unit, information for managing the configuration of the LU, and the like.

Note that the program and the information stored in the main memory 230 may be stored in the storage device 250, for example. In this case, the CPU 220 obtains the program and the information from the storage device 250, and loads the obtained program and information to the main memory 230.

The storage device 250 may be a device such as an HDD (Hard Disk Drive) or an SSD (Solid State Drive) that is configured to store therein data.

The storage module 200 builds a RAID using a plurality of the storage devices 250, generates the LU from a RAID volume, and further, provides the LU to the server module 100.

Figure 2:
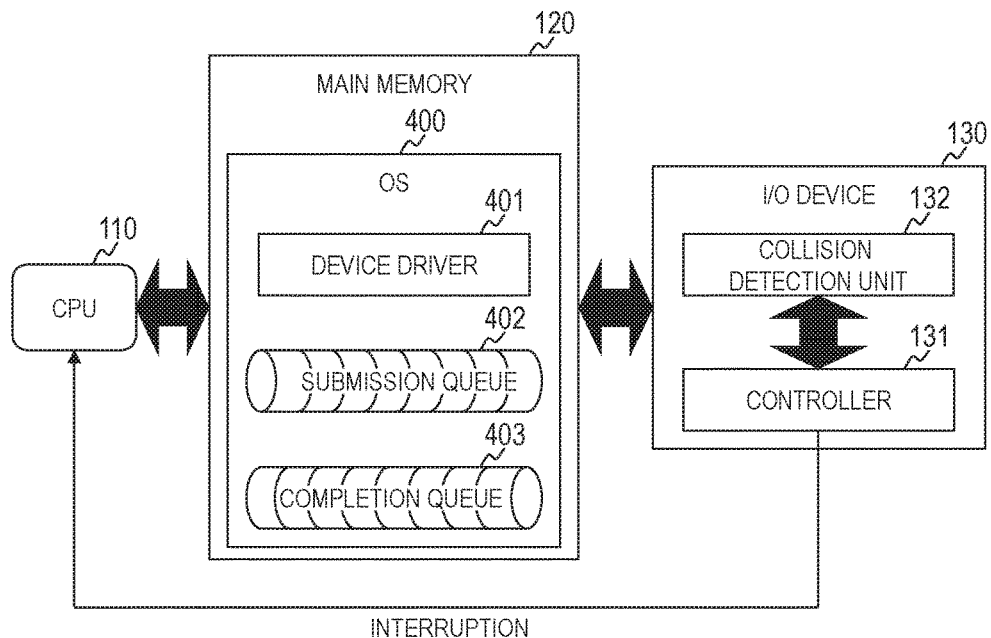
FIG. 2 is an explanatory diagram illustrating input-output relationship of data on a server module according to the first embodiment.
Figure 3A:
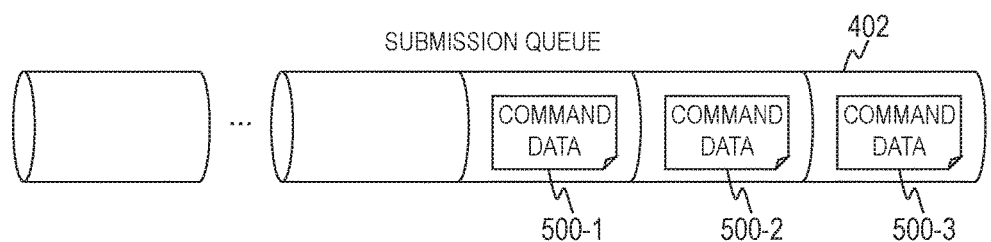
FIG. 3A is an explanatory diagram illustrating an example of a configuration of a submission queue according to the first embodiment.
Figure 3B:
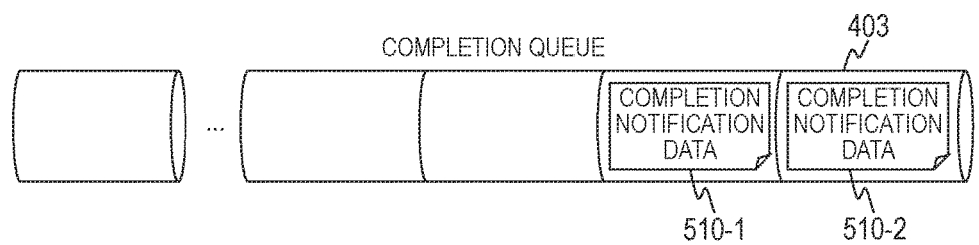
FIG. 3B is an explanatory diagram illustrating an example of a configuration of a completion queue according to the first embodiment.
Figure 4A:
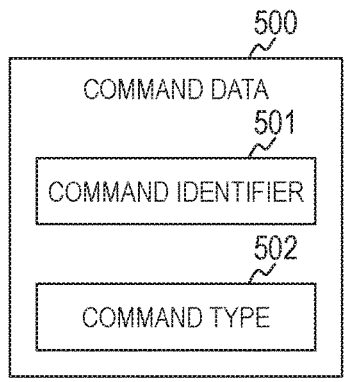
FIG. 4A is an explanatory diagram illustrating an example of a configuration of command data according to the first embodiment.
Figure 4B:
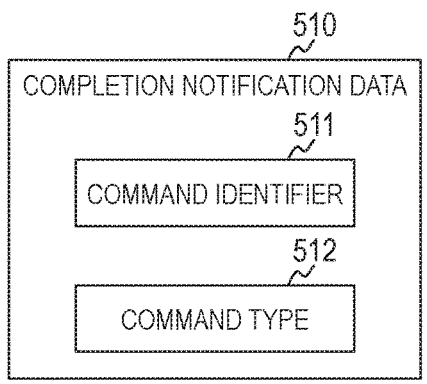
FIG. 4B is an explanatory diagram illustrating an example of a configuration of completion notification data according to the first embodiment.

FIG. 2 is an explanatory diagram illustrating the input-output relationship of data on the server module 100 according to the first embodiment. FIG. 3A is an explanatory diagram illustrating an example of a configuration of a submission queue 402 according to the first embodiment. FIG. 3B is an explanatory diagram illustrating an example of a configuration of a completion queue 403 according to the first embodiment. FIG. 4A is an explanatory diagram illustrating an example of a configuration of command data according to the first embodiment. FIG. 4B is an explanatory diagram illustrating an example of a configuration of completion notification data according to the first embodiment.

First, a configuration of the OS 400 stored in the main memory 120 will be described. The OS 400 includes a device driver 401, a submission queue 402, and a completion queue 403. Note that the OS 400 includes components, such as file system and the like, that are not shown.

The device driver 401 is a software configured to operate the I/O device 130. Note that the device driver 401 may not be included in the OS 400. For instance, the device driver 401 may be provided as a program module that is operable to be incorporated.

The submission queue 402 is a queue for registering the command data that is configured to give an order to the I/O device 130 to perform its tasks, in other words, an I/O request. The completion queue 403 is a queue for registering the completion notification data 510 that is configured to notify a completion of a process, in other words, a response to the I/O request.

In FIG. 3A, command data 500-1, 500-2, and 500-3 are registered in each of the three entries of the submission queue 402. Also, in FIG. 3B, completion notification data 510-1 and 510-2 are registered in each of the two entries of the completion queue 403.

The command data 500 includes, as illustrated in FIG. 4A, a command identifier 501 and a command type 502. Note that the command data 500 includes information other than the command identifier 501 and the command type 502, but the description of such other information will be omitted as it is unrelated to the present invention.

Also, the completion notification data 510 includes, as illustrated in FIG. 4B, a command identifier 511 and a command type 512. Note that the completion notification data 510 includes information other than the command identifier 511 and the command type 512, but the description of such information will be omitted as it is unrelated to the present invention.

Here, a summary of an I/O process according to first embodiment will be described.

The OS 400 calls the device driver 401 in a case of receiving an I/O request from an application, or the like, which is not show.

The device driver 401 generates the command data 500 based on the I/O request, and registers the command data 500 in the submission queue 402.

The controller 131 of the I/O device 130 reads out the command data 500 registered in the submission queue 402 at a predetermined timing. Note that a method for this execution with the command data 500 may be carried out an "in order" or "out of order" manner.

The controller 131 outputs, in order to determine whether or not the command identifier 501 included in the read command data 500 collides with another, said command identifier 501 to the collision detection unit 132.

The collision detection unit 132 manages the usage state of the command identifier 501. The collision detection unit 132 checks the usage state of the command identifier 501 upon receiving an inquiry from the controller 131, and outputs the result indicated the usage state of the command identifier 501 to the controller 131.

In a case where it is determined that the command identifier 501 collides with another, the controller 131 generates the completion notification data 510 indicating that the command identifier 501 collides with another, and registers the generated completion notification data 510 in the completion queue 403. Also, the controller 131 generates an interruption by outputting to the CPU 110 a signal indicating that the completion notification data 510 has been written in the completion queue 403.

In a case where it is determined that the command identifier 501 does not collide with another, the controller 131 executes a process corresponding to the read command data 500. The controller 131, after said process is complete, registers in the completion queue 403 the completion notification data 510 corresponding to the read command data 500. Also, the controller 131 generates an interruption by outputting to the CPU 110 a signal indicating that the completion notification data 510 has been written in the completion queue 403.

The CPU 110, upon receiving an interruption, executes a predetermined process, and then completes the I/O process. For example, in a case where the completion notification data 510 indicating that the command identifier 501 collides with another is executed, the CPU 110 deletes the command data 500 that includes the command identifier 501 from the submission queue 402, or restarts the OS 400.

Figure 5:
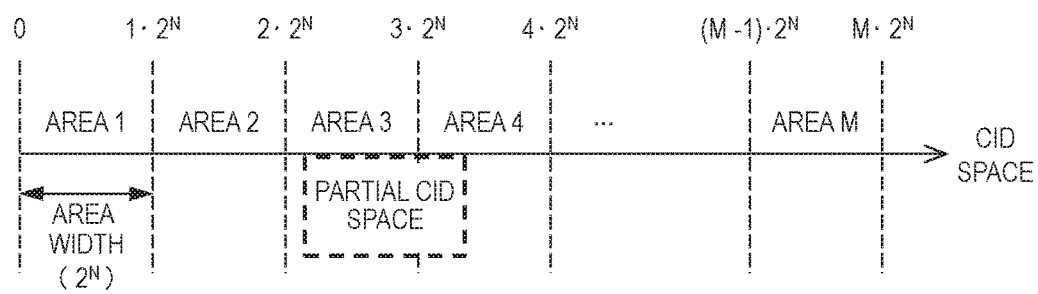
FIG. 5 is an explanatory diagram illustrating an example of a command identifier space and a partial command identifier space according to the first embodiment.

FIG. 5 is an explanatory diagram illustrating an example of a command identifier space and a partial command identifier space according to the first embodiment.

The command identifier space is a set of command identifiers the I/O device is operable to assign. Note that the size of the command identifier space of the first embodiment, in other words, the number of the command identifiers included in the command identifier space is a value calculated by using the following formula (1). Note that M and N are a natural number.

[FORMULA 1]

$$M \times 2^N \tag{1}$$

In the first embodiment, the command identifier space is divided into M number of areas. Each of the divided areas has the same size as others. Accordingly, the size of one area of the first embodiment is as large as "$2^N$."

The partial command identifier space is a partial space of the command identifier space. The collision detection unit 132 has defined therein the partial command identifier space, and determines whether or not the command identifier 501 included in the partial command identifier space collides with another. A size of the partial command identifier space of the first embodiment is set to be the same size as the divided area. That is to say, the size of the partial command identifier space is as large as "$2^N$."

Note that the size of the partial command identifier space may be set arbitrarily. However, in a case where the size of the partial command identifier space is large, the circuit required for the collision detection unit 132 to manage the partial command identifier space becomes large accordingly. Therefore, the size of the partial command identifier space needs to be set such as to effectively manage the collision of the command identifiers 501 while limiting the size of the circuit from expanding. For example, N is set as "8," "10" or "16," or the like. According to the first embodiment, N will be set as "4" to simplify the description.

The collision detection unit 132 includes two control modes for controlling the arrangement of the partial command identifier space.

One of the control modes is a control mode that fixes the position of the partial command identifier space within the command identifier space. With this control mode, the collision detection unit 132 detects the collision of the command identifier included in the fixed partial command identifier space. In the description below this control model will be indicated as a first control mode.

The other control mode is a control mode that dynamically modifies the position of the partial command identifier space within the command identifier space in accordance with the usage state of the command identifier 501. With this control mode, the collision detection unit 132 detects the collision of the command identifier included in the partial command identifier space whose position was changed. In the description below this control mode will be indicated as a second control mode.

The collision detection unit 132 analyzes the command identifier 501 inputted from the controller 131, and switches the control mode based on the result of the analysis. That is, the collision detection unit 132 changes the control method for the arrangement of the partial command identifier space based on the analysis result of the inputted command identifier 501. Note it is assumed that the first control mode is used for the collision detection unit 132 during the initial state.

Here, the reason why the collision detection unit 132 includes two control modes will be described. An assigning method of the command identifier 501 is different for the OS 400 or the device driver 401, and there are roughly two assigning methods that are known.

The first assigning method is a method for assigning a command identifier included in a fixed partial space of the command identifier space. In this assigning method, the collision detection unit 132 only manages the usage state of the command identifier of the fixed partial space. That is, the collision detection unit 132 is operable to handle the first control mode.

The other assigning method is a method for assigning all command identifiers in the command identifier space in an ascending order of the value of each command identifier. In this assigning method, the collision detection unit 132 manages the usage state of all the command identifiers in the command identifier space. However, since the command identifiers are assigned in an ascending order, the collision detection unit 132 is only required to shift the managed partial space in accordance with the usage state of the command identifiers. That is, the collision detection unit 132 is operable to handle the second control mode.

The assigning method of command identifiers depends, as described above, on the OS 400 or the device driver 401. Therefore, the I/O device 130 is unable to know to which assigning method the OS 400 or the device driver 401 corresponds. This is why the collision detection unit 132 analyzes the inputted command identifier 501, and switches the control mode based on the analysis result. By virtue of this configuration, the I/O device 130 is operable to detect the collisions of the command identifiers with the OS 400 or the device driver 401.

In the description below, the command identifier space will be indicated as a CID space, and the partial command identifier space will be indicated as a partial CID space. Note that the CID denotes the command identifier.

Figure 6:
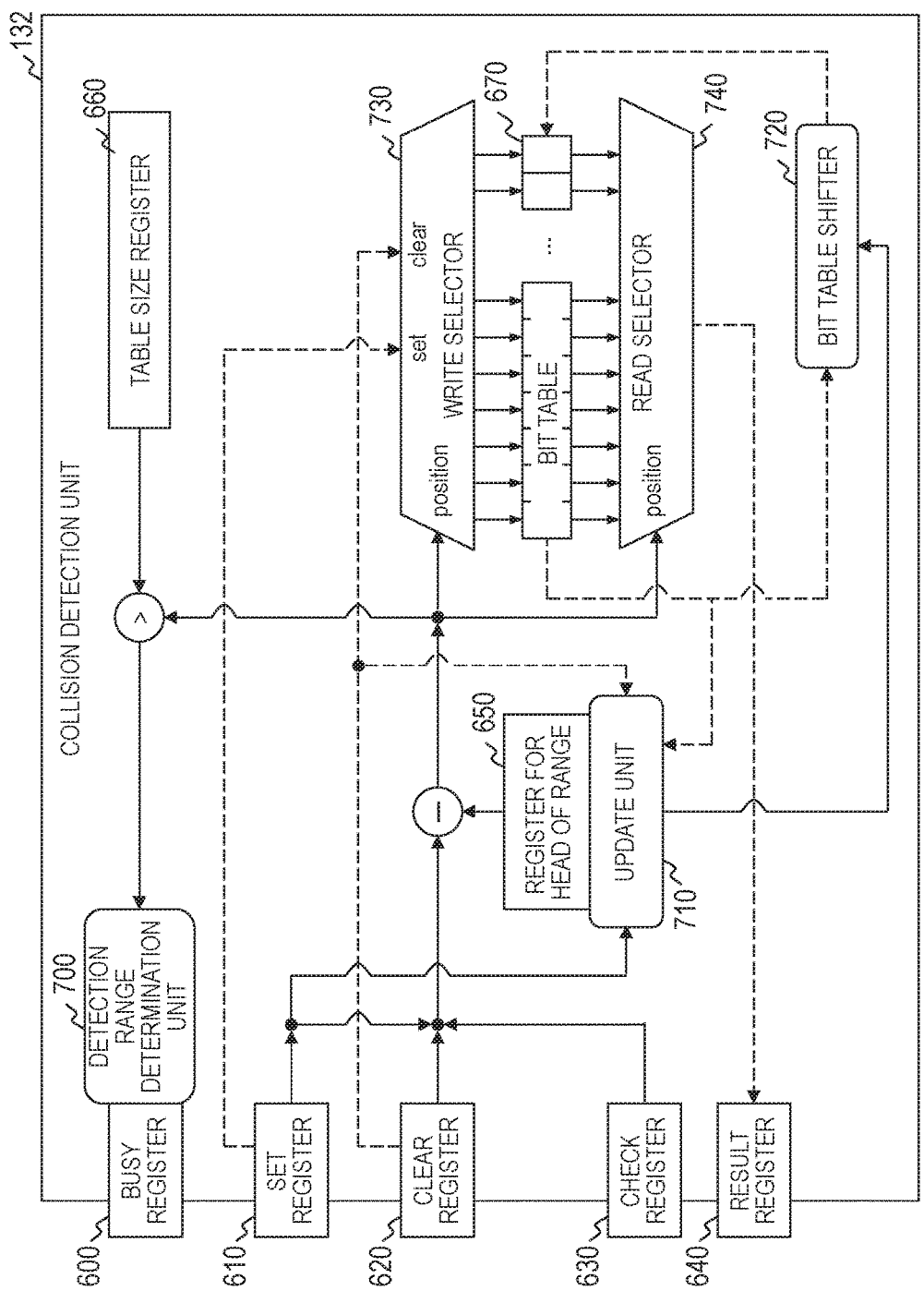
FIG. 6 is an explanatory diagram illustrating an example of a configuration of a collision detection unit according to the first embodiment.

FIG. 6 is an explanatory diagram illustrating an example of a configuration of the collision detection unit 132 according to the first embodiment. The collision detection unit 132 includes a plurality of registers and a plurality of logic circuits.

The collision detection unit 132 includes, as its registers, a busy register 600, a set register 610, a clear register 620, a check register 630, a result register 640, a register for head of range 650 and a table size register 660. Also, the collision detection unit 132 includes a bit table 670.

Further, the collision detection unit 132 includes, as its logic circuits, a detection range determination unit 700, an update unit 710, a bit table shifter 720, a write selector 730 and a read selector 740.

The busy register 600 is a register configured to set a value which indicates whether or not the command identifier 501 inputted from the controller 131 is included in the partial CID space. The busy register 600 is set to "0" or "1." "0" indicates that the inputted command identifier 501 is included in the partial CID space, while "1" indicates that the inputted command identifier 501 is not included in the partial CID space.

The set register 610, the clear register 620 and the check register 630 are the registers configured to set the command identifier 501 inputted from the controller 131.

The command identifier 501 newly assigned by the device driver 401 is set in the set register 610. The command identifier 501 included in the command data 500 corresponding to a process that is completed is set in the clear register 620. The command identifier 501 that will be determined whether or not it collides with another is set in the check register 630.

The result register 640 is a register for setting therein a value indicating whether or not the command identifier 501 set in the check register 630 collides with another. The result register 640 stores therein a value that is read out from a predetermined bit of the bit table 670, which will be described below.

The register for head of range 650 is a register for setting a command identifier that indicates a head of the partial CID space within the CID space. The register for head of range 650 according to the first embodiment sets therein the command identifier itself. For example, in a case of a command identifier indicating the head of the partial CID space is "0x17," "0x17" will be set in the register for head of range 650. Note it is assumed that according to the first embodiment, "0x00 (hexadecimal notation)" which indicates "0" in decimal system is set as an initial value of the register for head of range 650. Note that the initial value for the register for head of range 650 may be set arbitrarily.

In the description below a value assigned with "0x" at an upper digit is a value indicated in hexadecimal notation, while a value without "0x" is a value indicated in the decimal system. Also, to simplify the description, the decimal system will be used unless otherwise necessary.

The table size register 660 is a register for setting a size of the bit table 670 which will be described below. The size of the bit table 670 of the first embodiment will be the size of the partial CID space.

The collision detection unit 132 of the first embodiment is operable to define the partial CID space within the CID space as illustrated in FIG. 5 by using the register for head of range 650 and the table size register 660.

The bit table 670 is a bit table for managing the usage state of the command identifier 501 included in the partial CID space. The bit table 670 includes an arrangement of as many bits as those set in the table size register 660.

Each bit of the bit table 670 is assigned with an address indicating the position (order) in the arrangement starting from the left side. Note that according to the first embodiment, an address between "0" to "$2^N-1$" is set in each bit. Also, 1 bit in the bit table 670 corresponds to one command identifier 501. Therefore, a value calculated by adding an address to the value of the register for head of range 650 is the value of the command identifier 501 included in the partial CID space.

Also, a value indicating the usage state of the command identifier 501 is set in each bit. According to first embodiment, "0" or "1" is set in each bit. "0" indicates that the command identifier 501 is not in use, while "1" indicates that the command identifier 501 is in use.

The detection range determination unit 700 determines whether or not the command identifier 501 that is inputted from the controller 131 is within a detection range, that is, the detection range determination unit 700 determines whether or not the command identifier 501 is included in the partial CID space. The detection range determination unit 700 sets the result of the determination in the busy register 600.

The update unit 710 manages the position of the head of the partial CID space within the CID space. Also, the update unit 710 controls the update process of the bit table 670 to achieve the shifting of the partial CID space.

The bit table shifter 720 executes, in cooperation with the update unit 710, the update process of the bit table 670. By this, the position of the partial CID space in the CID space is changed.

The write selector 730 changes the value that indicates the usage state of the command identifier 501 included in the partial CID space. To be more specific, the write selector 730 writes either "1" or "0" on a predetermined bit of the bit table 670.

The read selector 740 reads out the value indicating the usage state of the command identifier 501 included in the partial CID space. To be more specific, the read selector 740 reads out a value from a predetermined bit of the bit table 670.

Note that in FIG. 6, solid lines indicate the flow of data that includes the command identifier 501 or register values, while dotted lines indicate the flow of 1-bit data. Also, a negative sign indicates an arithmetic process of subtraction, while the sign of inequality indicates an arithmetic process of comparing.

Next, the I/O process executed by the server module 100 according to the first embodiment will be described.

Figure 7:
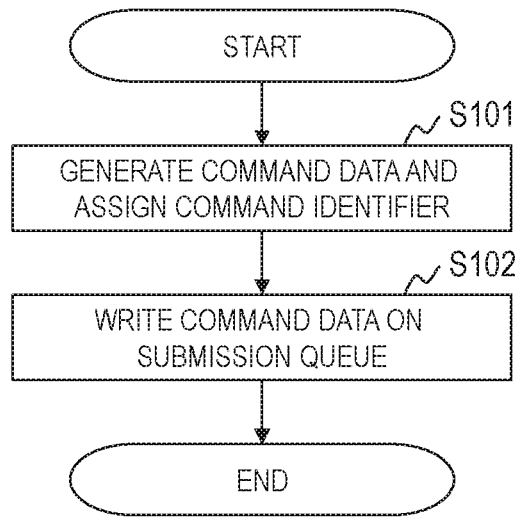
FIG. 7 is a flow chart for explaining a process executed by a device driver according to the first embodiment in a case where the device driver receives an I/O request.

FIG. 7 is a flow chart for explaining a process executed by the device driver 401 according to the first embodiment in a case where the device driver 401 receives an I/O request.

The device driver 401 starts a process described below in a case of receiving an I/O request from the OS 400.

The device driver 401 generates the command data 500 based on the received I/O request (Step S101).

To be more specific, the device driver 401 generates the command data 500 that realizes a process corresponding to the received I/O request. The command data 500 includes the command identifier 501 and the command type 502 which are assigned by the device driver 401.

The device driver 401 writes the generated command data 500 in the submission queue 402 (Step S102), and ends the process. At this point, the device driver 401 writes a value in a predetermined register, such as a doorbell register, to notify that the command data 500 has been written in the submission queue 402.

Figure 8:
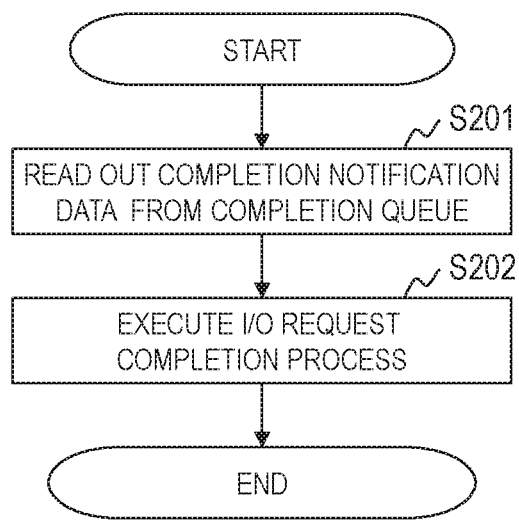
FIG. 8 is a flow chart for explaining a process executed by the device driver according to the first embodiment in a case where the device driver detects a completion notification.

FIG. 8 is a flow chart for explaining a process executed by the device driver 401 according to the first embodiment in a case where the device driver 401 detects a completion notification.

The CPU 110 has the device driver 401 execute the following process, in a case where the CPU 110 receives from the I/O device 130 a signal indicating that the completion notification data 510 has been written in the completion queue 403.

The device driver 401 reads out the completion notification data 510 from the completion queue 403 (Step S201). The device driver 401 executes a predetermined I/O request completion process (Step S202), and then ends the process. Note that the I/O request completion process is different for each OS 400, but since such process is well known in the art, description of such process will be omitted.

Figure 9:
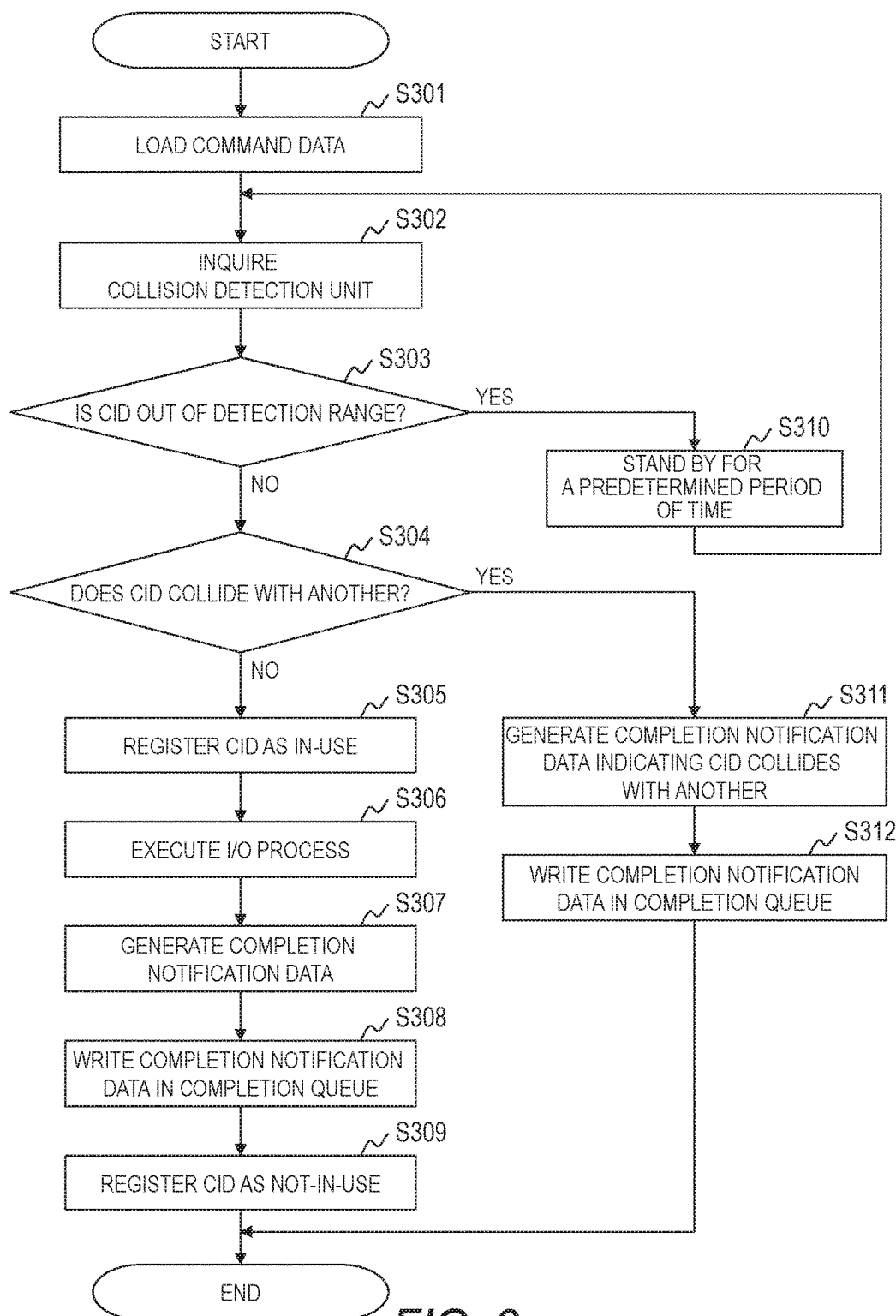
FIG. 9 is a flow chart for explaining a process executed by an I/O device according to the first embodiment.

FIG. 9 is a flow chart for explaining a process executed by the I/O device 130 according to the first embodiment. The controller 131 of the I/O device 130 executes, in cooperation with the collision detection unit 132, a process which will be described below.

The I/O device 130 starts a process described below in a case of detecting that the command data 500 has been written in the submission queue 402. According to the present embodiment the I/O device 130 starts a process described below in a case of detecting that a value has been written in a predetermined register such as a doorbell register by the device driver 401.

The controller 131 reads out the command data 500 from the submission queue 402 (Step S301). The controller 131 sends an inquiry to the collision detection unit 132 as to whether or not the command identifier 501 included in the read command data 500 collides with another (Step S302).

To be more specific, the controller 131 reads out the command data 500 from the submission queue 402, and sets in the check register 630 the command identifier 501 included in the read command data 500. The collision detection unit 132 executes a process illustrated in FIG. 11 in a case where the command identifier 501 is set in the check register 630.

The controller 131 determines whether or not the command identifier 501 of the inquiry is outside of the detection range (Step S303). That is, the controller 131 determines whether or not the command identifier 501 of the inquiry is included in the partial CID space.

To be more specific, the controller 131 determines whether or not receiving from the collision detection unit 132 a signal indicating that the busy register 600 is set as "1." In a case where the controller 131 receives from the collision detection unit 132 the signal indicating that the busy register 600 is set as "1," the controller 131 determines that the command identifier 501 of the inquiry is outside of the detection range.

In a case where it is determined that the command identifier 501 of the inquiry is outside of the detection range, the controller 131 holds off the execution of the read command data 500 for a predetermined period of time (Step S310). The controller 131 returns to Step S302 after the predetermined period of time, and makes an inquiry again to the collision detection unit 132 as to whether or not the command identifier 501 collides with another. If the controller 131 has another process that needs to be executed while it holds off the execution of the command data 500, the controller 131 may execute such process during this period.

To be more specific, the 131 writes the read command data 500 in the submission queue 402, and after a predetermined period of time makes an inquiry again to the collision detection unit 132 regarding the command identifier 501 included in the read command data 500. For example, the controller 131 may make the second inquiry regarding the command identifier 501 by generating an interruption, or the like, after the process in Step S309 for another command data 501 is completed.

In a case where it is determined that the command identifier 501 of the inquiry is within the detection range, the controller 131 determines whether or not the command identifier 501 of the inquiry collides with another (Step S304).

To be more specific, the controller 131 determines as to whether or not receiving from the collision detection unit 132 a signal indicating that the result register 640 is set as "1." In a case where the controller 131 receives from the collision detection unit 132 the signal indicating that the result register 640 is set as "1," the controller 131 determines that the command identifier 501 of the inquiry collides with another.

In a case where it is determined that the command identifier 501 of the inquiry does not collide with another, the controller 131 instructs the collision detection unit 132 to register the command identifier 501 of the inquiry as in-use (Step S305).

To be more specific, the controller 131 sets the command identifier 501 of the inquiry in the set register 610. The collision detection unit 132 executes a process illustrated in FIG. 10 in a case where the command identifier 501 of the inquiry is set in the set register 610.

The controller 131 executes the I/O process that corresponds to the read command data 500 (Step S306). The controller 131, upon completion of the I/O process, generates the completion notification data 510 (Step S307), and writes the generated completion notification data 510 in the completion queue 403 (Step S308).

The controller 131 instructs the collision detection unit 132 to register the command identifier 501 included in the executed command data 500 as not-in-use (Step S309). Then, the I/O device 130 ends the process.

To be more specific, the controller 131 sets the command identifier 501 included in the executed command data 500 in the clear register 620. The collision detection unit 132 executes a process illustrated in FIG. 12 in a case where the command identifier 501 is set in the clear register 620.

In a case where it is determined in Step S304 that the command identifier 501 of the inquiry collides with another, the I/O device 130 generates the completion notification data 510 indicating that the command identifier 501 collides with another (Step S311). The I/O device 130 writes the generated completion notification data 510 in the completion queue 403 (Step S312).

The OS 400 stops the execution of the command data 500 in a case of receiving the completion notification data 510 indicating that the command identifier 501 collides with another. At this point, a predetermined failure process may be executed. For example, the OS 400 may be restarted, or the command data 500 may be reissued. Note that the present invention is not limited to the process that is executed after the detection of the collision of the command identifier 501.

Figure 10:
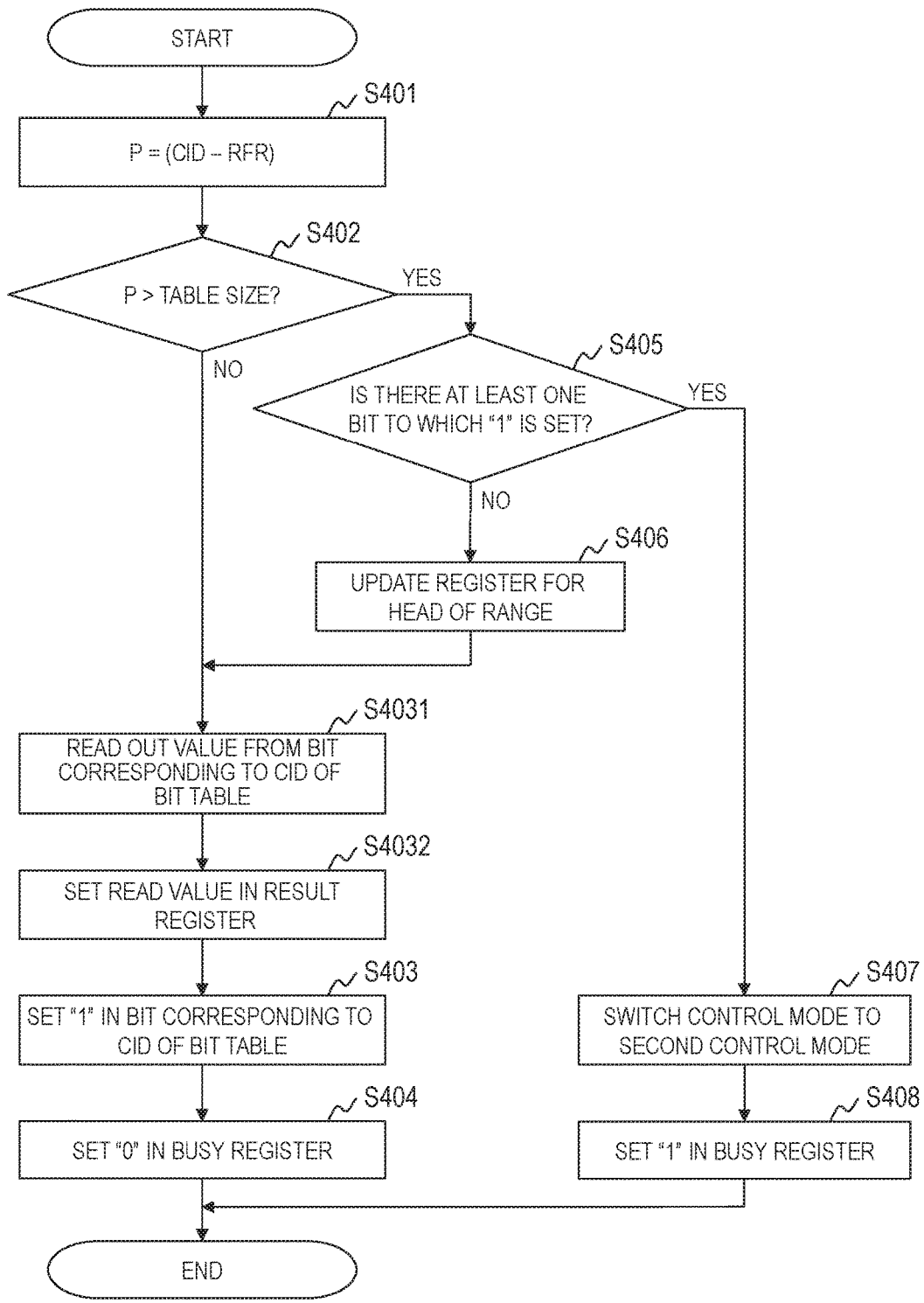
FIG. 10 is a flow chart for explaining a process executed by the collision detection unit according to the first embodiment in a case where a command identifier is set in a set register.

FIG. 10 is a flow chart for explaining a process executed by the collision detection unit 132 according to the first embodiment in a case where the command identifier 501 is set in the set register 610.

The collision detection unit 132 starts a process described below in a case where the collision detection unit 132 detects that the command identifier 501 is set in the set register 610.

The collision detection unit 132 substitutes the command identifier 501 set in the set register 610 and the value of the register for head of range 650 in the formula (2) below to calculate the value P (Step S401). Here, the CID denotes the command identifier 501, while the RFR denotes the value of the register for head of range 650.

[FORMULA 2]

$$P = CID - RFR \tag{2}$$

The collision detection unit 132 determines whether or not the calculated value P is greater than the value set in the table size register 660 (Step S402). That is, the collision detection unit 132 determines whether or not the command identifier 501 set in the set register 610 is included in the detection range (partial CID space). In a case where the value P is equal to or smaller than the value set in the table size register 660, it is determined that the command identifier 501 set in the set register 610 is included in the detection range.

In a case where it is determined that the calculated value P is equal to or smaller than the value set in the table size register 660, the collision detection unit 132 reads out a value from a bit of the bit table 670 corresponding to the command identifier 501 set in the set register 610 (Step S4031).

To be more specific, the collision detection unit 132 outputs the position (value P) of the command identifier 501 in the bit table 670 to the read selector 740. The collision detection unit 132 reads out the value of the bit that corresponds to the command identifier 501 by operating the read selector 740.

The collision detection unit 132 sets the value read out from the bit corresponding to the command identifier 501 in the result register 640 (Step S4032). At this point, the collision detection unit 132 transmits to the controller 131 a signal corresponding to the value written in the result register 640. By virtue of such configuration, the processes that are executed in Step S304 and Step S305 are expedited.

The collision detection unit 132 updates the bit table 670 (Step S403).

To be more specific, the collision detection unit 132 outputs to the write selector 730 the position of the command identifier 501 in the bit table 670. The position of the command identifier 501 in the bit table 670 corresponds to the value P. In other words, the command identifier 501 corresponds to the bit to which the address "P" is set. The collision detection unit 132 writes in the bit corresponding to the command identifier 501 "1" by operating the write selector 730.

For example, in a case where the command identifier 501 is "0x17" and the value P is "14," the write selector 730 writes "1" in the bit where the address is set as "14."

Next, the detection range determination unit 700 of the collision detection unit 132 writes "0" in the busy register 600 (Step S404). Then, the collision detection unit 132 ends the process.

In a case where it is determined in Step S402 that the calculated value P is greater than the value set in the table size register 660, the collision detection unit 132 determines whether or not the bit table 670 includes at least one or more bits set as "1" (Step S405).

In a case where it is determined that the bit table 670 includes no bit set as "1", the collision detection unit 132 updates the value of the register for head of range 650 (Step S406), and then proceeds to Step S4031. The method to update the values in the register for head of range 650 may include two methods as below, for example.

(1) First, the command identifier 501 set in the set register 610 is inputted in the update unit 710. The update unit 710 writes the inputted command identifier 501 in the register for head of range 650. Note that the values for all bits in the bit table 670 are set as "0." By this, the command identifier 501 set in the set register 610 will be set as the head of the bit table 670, that is, the command identifier 501 will be set as the head of the partial CID space.

(2) The update unit 710 adds or subtracts a predetermined value to or from the inputted command identifier 501. The update unit 710 writes the computed command identifier 501 in the register for head of range 650. Note that the values for all bits in the bit table 670 are set as "0." By this, the predetermined 501 will be set as the head of the bit table 670, that is, the command identifier 501 will be set as the head of the partial CID space.

In a case where the execution method of the command data 500 is the out of order manner, the update methods (1) and (2) include the following differences there between. The update method (1) is inoperable to detect the collision of newly inputted command identifier 501 in a case where the newly inputted command identifier 501 is smaller than the inputted command identifier 501. Accordingly, the performance of the I/O process may be deteriorated. On the other hand, the update method (2) is operable to detect the collision of adjacent command identifier 501 of the inputted command identifier 501.

The above is the description for the process of Step S406.

In a case where it is determined in Step S405 that the bit table 670 includes a bit set as "1," the collision detection unit 132 switches the control mode from the first control mode to the second control mode (Step S407). In a case where the second control mode is already in use, the collision detection unit 132 may omit the process of Step S407.

The detection range determination unit 700 of the collision detection unit 132 writes "1" in the busy register 600 (Step S408). Then, the collision detection unit 132 ends the process.

Figure 11:
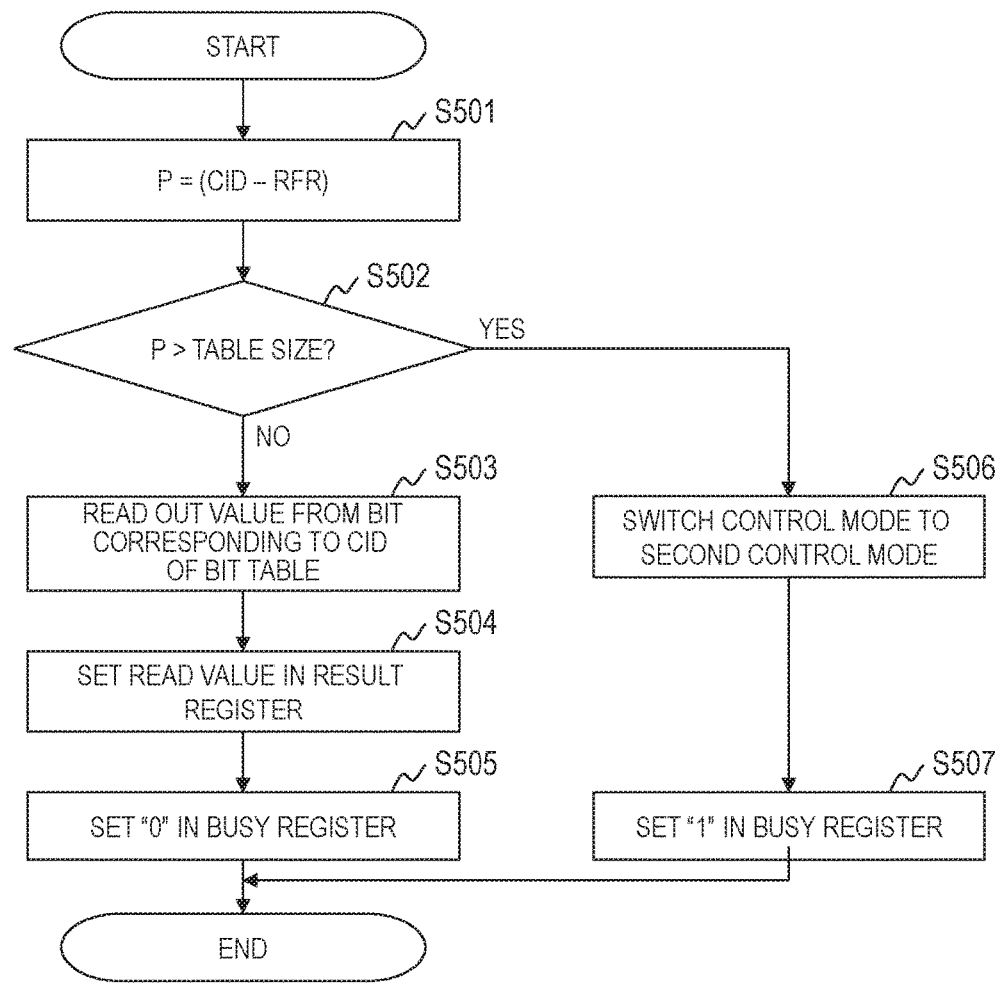
FIG. 11 is a flow chart for explaining a process executed by the collision detection unit according to the first embodiment in a case where the command identifier is set in a check register.

FIG. 11 is a flow chart for explaining a process executed by the collision detection unit 132 according to the first embodiment in a case where the command identifier 501 is set in the check register 630.

The collision detection unit 132 starts a process described below in a case where the collision detection unit 132 detects that the command identifier 501 is set in the check register 630.

The collision detection unit 132 substitutes the command identifier 501 set in the check register 630 and the value of the register for head of range 650 in the formula (2) to calculate the value P (Step S501). The collision detection unit 132 determines whether or not the calculated value P is greater than the value set in the table size register 660 (Step S502).

In a case where it is determined that the calculated value P is equal to or smaller than the value set in the table size register 660, the collision detection unit 132 reads out a value from a bit of the bit table 670 corresponding to the command identifier 501 set the check register 630 (Step S503).

To be more specific, the collision detection unit 132 outputs the position (value P) of the command identifier 501 in the bit table 670 to the read selector 740. The collision detection unit 132 reads out the value of the bit corresponding to the command identifier 501 by operating the read selector 740.

The collision detection unit 132 sets the value read out from the bit corresponding to the command identifier 501 in the result register 640 (Step S504). At this point, the collision detection unit 132 transmits to the controller 131 a signal corresponding to the value written in the result register 640. Further, the detection range determination unit 700 of the collision detection unit 132 writes "0" in the busy register 600 (Step S505). Then, the collision detection unit 132 ends the process.

According to the first embodiment, the collision detection unit 132 reads out a value from a predetermined bit of the bit table 670, and the controller 131 detects whether or not the command identifier 501 collides with another based on said value. However, the collision detection unit 132 may determine whether or not the command identifier 501 collides with another based on the read out value. In this case, the collision detection unit 132 is only required to output to the controller 131 the result of the determination.

In a case where it is determined in Step S502 that the calculated value P is greater than the value set in the table size register 660, the collision detection unit 132 switches the control mode from the first control mode to the second control mode (Step S506).

The detection range determination unit 700 of the collision detection unit 132 writes "1" in the busy register 600 (Step S507). Then, the collision detection unit 132 ends the process.

Figure 12:
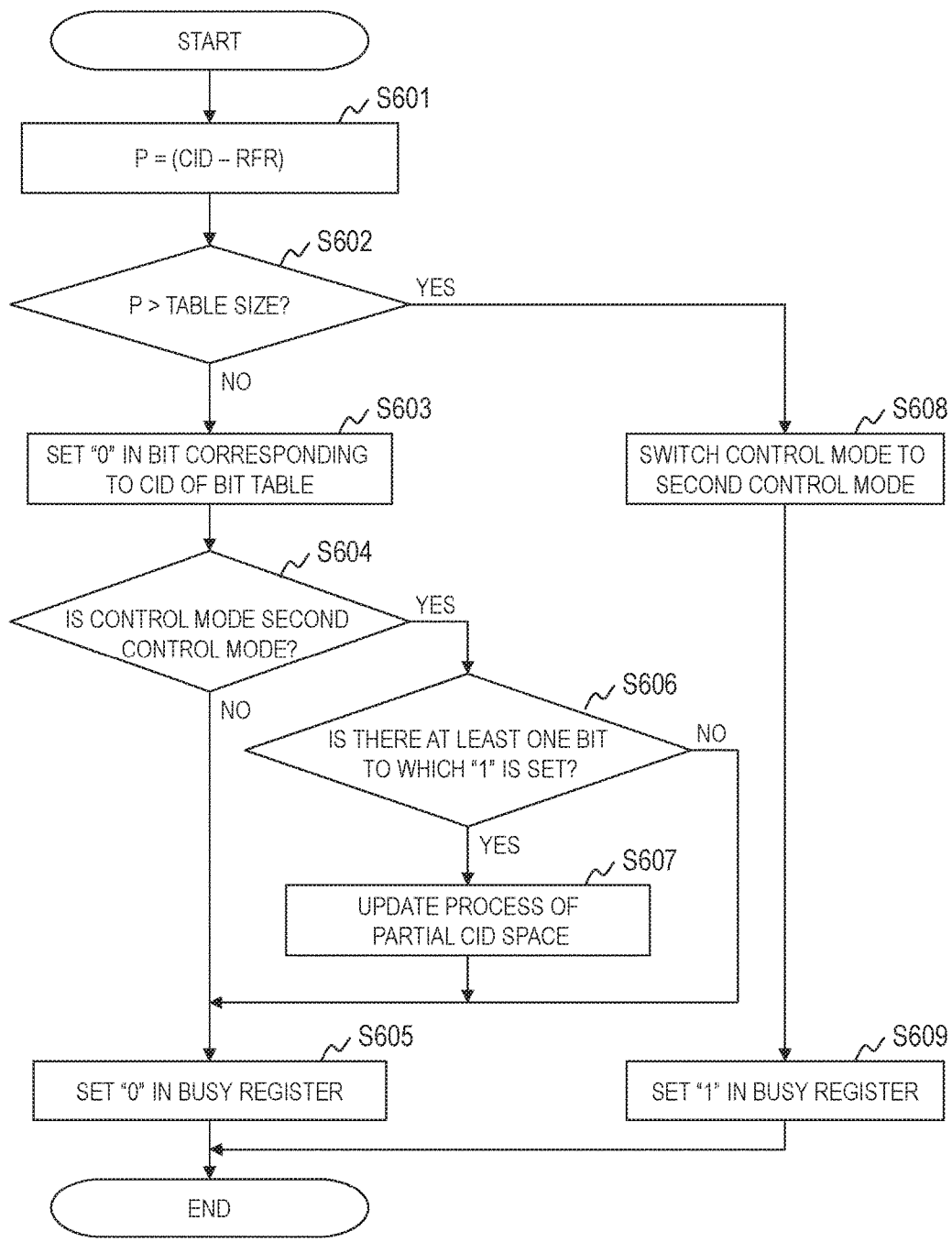
FIG. 12 is a flow chart for explaining a process executed by the collision detection unit according to the first embodiment in a case where the command identifier is set in a clear register.
Figure 13:
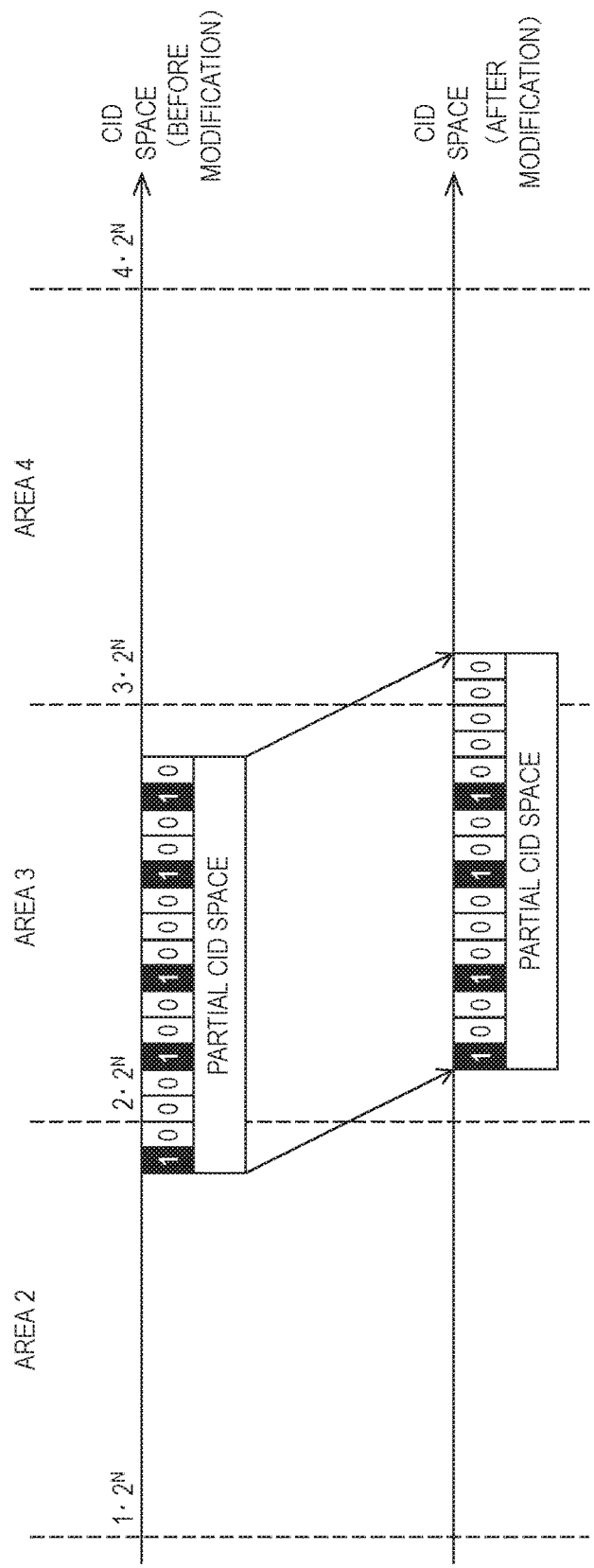
FIG. 13 is an explanatory diagram illustrating an example of a shift of a bit table in update process of a partial CID space executed by the collision detection unit according to the first embodiment.

FIG. 12 is a flow chart for explaining a process executed by the collision detection unit 132 according to the first embodiment in a case where the command identifier 501 is set in the clear register 620. FIG. 13 is an explanatory diagram illustrating an example of a shift of the bit table 670 in the update process of the partial CID space executed by the collision detection unit 132 according to the first embodiment.

The collision detection unit 132 starts a process described below in a case where the collision detection unit 132 detects that the command identifier 501 is set in the clear register 620.

The collision detection unit 132 substitutes the command identifier 501 set in the clear register 620 and a value of the register for head of range 650 in the formula (2) to calculate the value P (Step S601). The collision detection unit 132 determines whether or not the calculated value P is greater than the value set in the table size register 660 (Step S602).

In a case where it is determined that the calculated value P is equal to or smaller than the value set in the table size register 660, the collision detection unit 132 updates the bit table 670 (Step S603).

To be more specific, the collision detection unit 132 outputs the position (value P) of the command identifier 501 in the bit table 670 to the write selector 730. The collision detection unit 132 writes "0" in the bit corresponding to the command identifier 501 by operating the write selector 730.

The collision detection unit 132 determines whether or not the control mode is the second control mode (Step S604).

In a case where it is determined that the control mode is not the second control mode, that is, in a case where it is determined that the control mode is the first control, the collision detection unit 132 writes "0" in the busy register 600 (Step S605). Then, the collision detection unit 132 ends the process.

In a case where it is determined that the control mode is the second control, the collision detection unit 132 determines whether or not the bit table 670 includes at least one or more bits set as "1" (Step S606).

In a case where it is determined that the bit table 670 includes no bit set as "1," the collision detection unit 132 proceeds to Step S605.

In a case where it is determined that the bit table 670 includes a bit set as "1," the collision detection unit 132 executes the update process of the partial CID space (Step S607), and then proceeds to Step S605.

For the update process of the partial CID space, the collision detection unit 132 refers to the bit table 670 to retrieve a bit that is set as "1" and having a smallest address. Further, the collision detection unit 132 shifts the values of the bit table 670 such that the command identifier 501 corresponding to the retrieved bit becomes the head of the partial CID space. To be more specific, a following process will be executed.

First, the update unit 710 outputs an instruction to update the bit table 670 to the bit table shifter 720. The number of shift count of the bit table 670 will be set as "0."

The bit table shifter 720 outputs the value of the bit that corresponds to the smallest command identifier in the partial CID space, that is, the value of the bit whose address is the smallest, to the update unit 710. The update unit 710 determines whether or not the value of the outputted bit is "0."

In a case where it is determined that the outputted value of the bit is not "0," the update unit 710 ends the shift process. In a case where it is determined the outputted value of the bit is "0," the update unit 710 outputs an instruction to update the bit table 670 to the bit table shifter 720. The update unit 710 adds "1" to the shift count of the bit table 670.

The bit table shifter 720 shifts the values of the bit table 670 to the left as much as 1 bit. At this point, the bit table shifter 720 sets "0" to the bit that corresponds to the largest command identifier of the partial CID space, that is, the bit table shifter 720 sets "0" to the value of the bit having the largest address. Also, the bit table shifter 720 outputs the value of the bit having the smallest address in the bit table 670 to the update unit 710.

The update unit 710 determines whether or not the outputted value of the bit is "0." In a case where it is determined that the outputted value of the bit is not "0," the update unit 710 ends the shift process. In a case where it is determined that the outputted value of the bit is "0," the update unit 710 outputs an instruction to update the bit table 670 to the bit table shifter 720.

The update unit 710 repeatedly executes the above described process until the bit corresponding to the command identifier 501 in the head of the partial CID space is "1," that is, until the value at the left end of the bit table 670 is "1."

The update unit 710 adds to the value set in the register for head of range 650 the number of the shift count, in a case where the update unit 710 detects that the value at the left end of the bit table 670 is "1." In other words, the update unit 710 sets the command identifier 501 that corresponds to the bit set as "1" in the register for head of range 650. By the process described above, the position of the partial CID space shifts within the CID space.

Note that the update unit 710 may add "1" to the value of the register for head of range 650 in a case where the update unit 710 shifts the values of the bit table 670 as much as 1 bit. In this case, the update unit 710 does not need to count the number of the shift count.

As the update process of the partial CID space is executed as illustrated in FIG. 13, the position of the partial CID space within the CID space shifts. According to FIG. 13, in a case where the bit at the left end of the bit table 670 is set as "0" before the shift in Step S603, the collision detection unit 132 shifts the bit table 670 until the value of the bit is "1."

Note that in a case where the bit at the left end of the bit table 670 matches the boarder of the CID space, that is, said bit matches the command identifier 501 satisfying the formula (1), and the value of the said bit is "0" as a result of the shift of the bit table 670, the update unit 710 sets the value of the register for head of range 650 as "0."

The above is the description of the process in Step S607.

In a case where it is determined in Step S602 that the calculated value P is greater than the value set in the table size register 660, the collision detection unit 132 switches the control mode from the first control mode to the second control mode (Step S608). The detection range determination unit 700 of the collision detection unit 132 writes "1" in the busy register 600 (Step S609). Then, the collision detection unit 132 ends the process.

According to the first embodiment, the collision detection unit 132 is operable to reduce the amount of computer resource as the collision detection unit 132 monitors the collision of the command identifiers included in the partial CID space. Also, the collision detection unit 132 controls the arrangement of the partial CID space based on the control mode by switching the control mode in accordance with the usage state of the command identifier. Accordingly, the first embodiment is operable to achieve the I/O device 130 that is capable to limiting the amount of necessary computer resource, maintaining the I/O process performance, and detecting the collision of all command identifiers within the CID space.

Second Embodiment

According to a second embodiment, the configuration of the collision detection unit 132 is different from that of the collision detection unit 132 of the first embodiment. Hereinafter, the second embodiment will be described while focusing on the difference between the first embodiment and the second embodiment.

The configuration of the computer system of the second embodiment is the same as the configuration of the computer system of the first embodiment, and therefore the description thereof will be omitted. The configurations of the submission queue 402 and the completion queue 403 are the same as those in the first embodiment, and therefore the description thereof will be omitted. Also, the process executed by the device driver 401 of the second embodiment is the same as the process of the first embodiment, and therefore the description thereof will be omitted.

Figure 14:
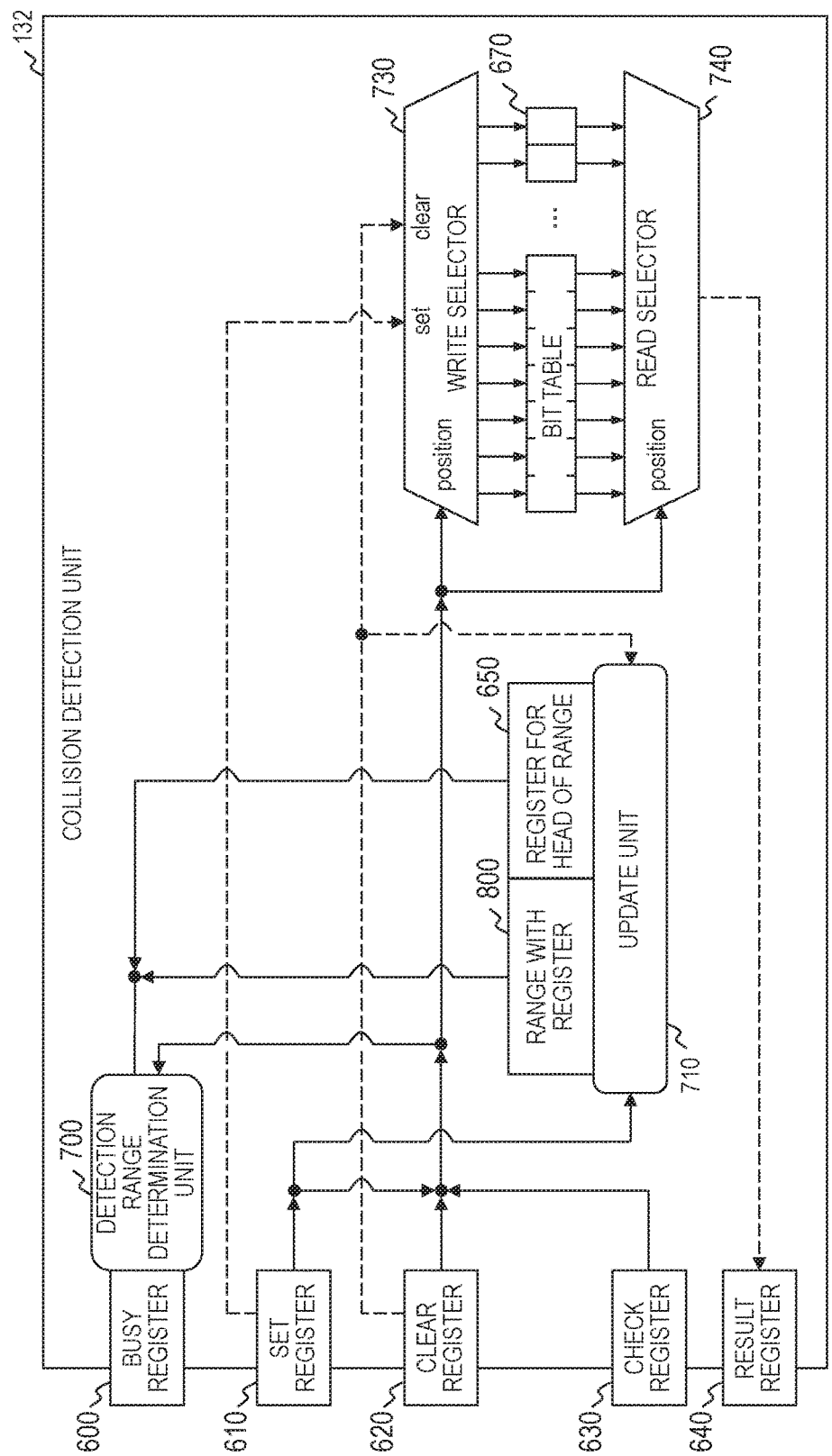
FIG. 14 is an explanatory diagram illustrating an example of a configuration of the collision detection unit according to the second embodiment.

FIG. 14 is an explanatory diagram illustrating an example of a configuration of the collision detection unit 132 according to the second embodiment.

The collision detection unit 132 of the second embodiment includes, as its registers, in the same manner as in the first embodiment, the busy register 600, the set register 610, the clear register 620, the check register 630, the result register 640 and the register for head of range 650. Also, the collision detection unit 132 according to the second embodiment includes, in the same manner as in the first embodiment, the bit table 670. Also, the collision detection unit 132 of the second embodiment includes, as its logical circuits, in the same manner as in the first embodiment, the detection range determination unit 700, the update unit 710, the write selector 730 and the read selector 740.

The collision detection unit 132 of the second embodiment includes a range width register 800 as a new register. Meanwhile, the collision detection unit 132 of the second embodiment does not include the table size register 660 and the bit table shifter 720.

The range width register 800 is a register for setting an area which includes the command identifier 501 that is the head of the partial CID space. Note in the description below that an area which includes the command identifier 501 that is the head of the partial CID space will be referred to as a reference area. The register for head of range 650 is a register for setting a position (address) of the command identifier 501 that is the head of the partial CID space in the reference area.

According to the first embodiment, the command identifier itself is set in the register for head of range 650. According to the second embodiment, on the other hand, a value that indicates the position within an area is set in the register for head of range 650.

According to the second embodiment, a CID space is divided into M number of areas each having a size of "$2^N$." Also, each area is set with an address to indicate its position within the area. In the description below, an address that is set in each bit of the bit table 670 will be referred to as the first address, while an address that indicates the position of an area will be referred to as the second address. The correlation between the first address and the second address will be described with reference to FIG. 16.

Note that the sizes of the partial CID space, an area and the bit table are set so that they are in accordance with one another. Accordingly, the second address matches the first address. Therefore, the range in which a value the register for head of range 650 is operable to be present is as expressed with the formula (3) below, and the range in which a value of the range width register 800 is operable to be present is as expressed with the formula (4) below. Here, RFR denotes the value of the register for head of range 650, while RRR denotes the value of the range width register 800.

FORMULA 3

$$0 < RFR < 2^N - 1 \qquad (3)$$

FORMULA 4

$$1 < RRR < M \qquad (4)$$

For example, in a case where the range width register 800 is "2" and the register for head of range 650 is "9," it shows that the command identifier 501 that is the head of the partial CID space is at a position whose second address in the area 2 is "9."

The detection range determination unit 700 of the second embodiment determines whether or not the command identifier 501 is included in the partial CID space by using the range width register 800 and the register for head of range 650 as will be described below. Also, the update unit 710 of the second embodiment changes the arrangement of the partial CID space within the CID space by updating the range width register 800 and the register for head of range 650 as will be described below.

Figure 15:
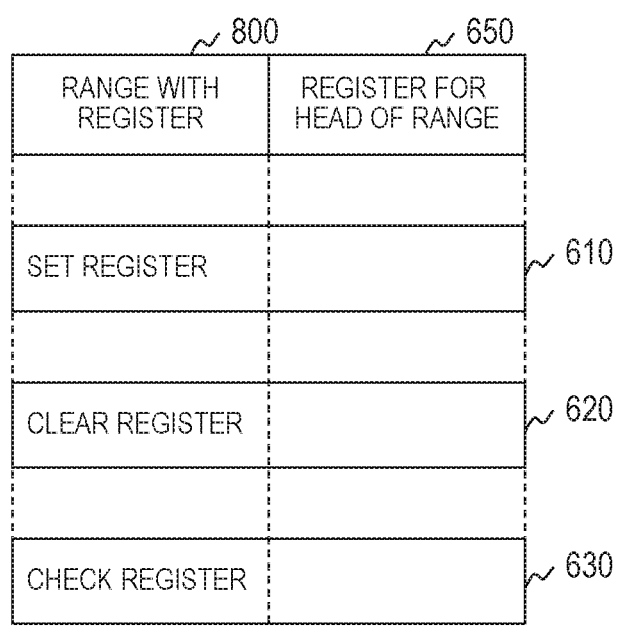
FIG. 15 is an explanatory diagram illustrating the correlation among the registers included in the collision detection unit according to the second embodiment.
Figure 16:
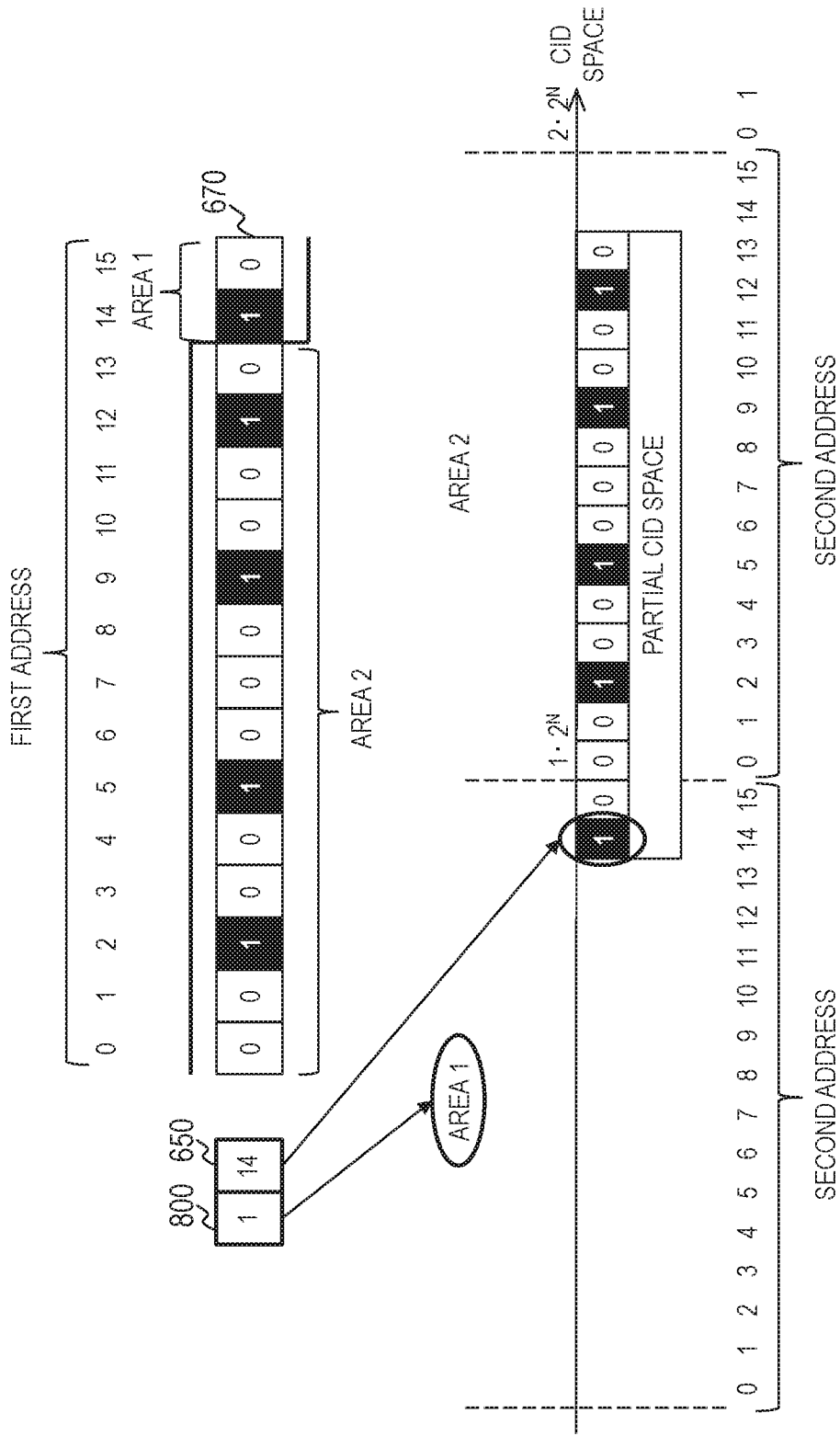
FIG. 16 is an explanatory diagram illustrating the correlation among the bit table, a register for head of range, a range width register and the partial CID space according to the second embodiment.

FIG. 15 is an explanatory diagram illustrating the correlation among the registers included in the collision detection unit 132 according to the second embodiment. FIG. 16 is an explanatory diagram illustrating the correlation among the bit table 670, the register for head of range 650, the range width register 800 and the partial CID space according to the second embodiment.

According to the second embodiment, an upper value of the command identifier 501 set for the set register 610, the clear register 620 and the check register 630 will be used as the value set for the range width register 800. Also, a lower value of the command identifier 501 set for the set register 610, the clear register 620 and the check register 630 will be used as the value set for the register for head of range 650.

As illustrated in FIG. 16, each bit of the bit table 670 is set with the first address between "0" and "15." Also, as illustrated in FIG. 16, each area is set with the second address between "0" and "15." As stated above, the first address corresponds one to one with the second address. For example, the first address "14" matches the second address "14" of a predetermined area.

Accordingly, the value set in the register for head of range 650 denotes the first address of a bit in the bit table 670, and denotes the second address of the command identifier 501 for an arbitrary area.

As illustrated in FIG. 16, the first address whose value is equal to or greater than the value of the first address set in the register for head of range 650 corresponds to the second address of the reference area. Also, the first address whose value is less than the value of the first address set in the register for head of range 650 corresponds to the second address of an area which is the reference area with "1" added thereto.

According to the second embodiment, the collision detection unit 132 specifies the command identifier 501 that is the head of the partial CID space within the CID space by using the register for head of range 650 and the range width register 800. To be more specific, the command identifier 501 that is the head of the partial CID space within the CID space is specified in a following manner.

The collision detection unit 132 specifies the reference area based on the value of the range width register 800. According to the example illustrated in FIG. 16, "1" is set in the range width register 800. Accordingly, the collision detection unit 132 is operable to specify that the command identifier 501 that is the head of the partial CID space is included in the area 1.

Also, the collision detection unit 132 specifies the position of the command identifier 501 that is the head of the partial CID space within the reference area based on the value of the register for head of range 650. According to the example illustrated in FIG. 16, "14" is set in the register for head of range 650. Accordingly, the collision detection unit 132 is operable to specify that the command identifier 501 that is the head of the partial CID space is at the position whose second address is "14" in the area 1.

The bit table 670 illustrated in FIG. 16 shows the state of the partial CID space as illustrated in FIG. 16.

The collision detection unit 132 of the first embodiment controls such that the command identifier 501 that is the head of the partial CID space becomes the head of the bit table 670. That is, the collision detection unit 132 of the first embodiment controls, as illustrated in FIG. 13, such that the partial CID space and the bit table 670 become the same form.

On the other hand, the collision detection unit 132 of the second embodiment does not change the position of the command identifier 501 that is the head of the partial CID space in the bit table 670. In other words, the process to shift the value of the bit table 670 will not be executed. The collision detection unit 132 of the second embodiment operates the register for head of range 650 and the range width register 800, instead of shifting the value of the bit table 670, so as to control the arrangement of the partial CID space within the CID space. Specific operation method of the register for head of range 650 and the range width register 800 will be described below.

Next, a process executed by the collision detection unit 132 of the second embodiment will be described.

Figure 17:
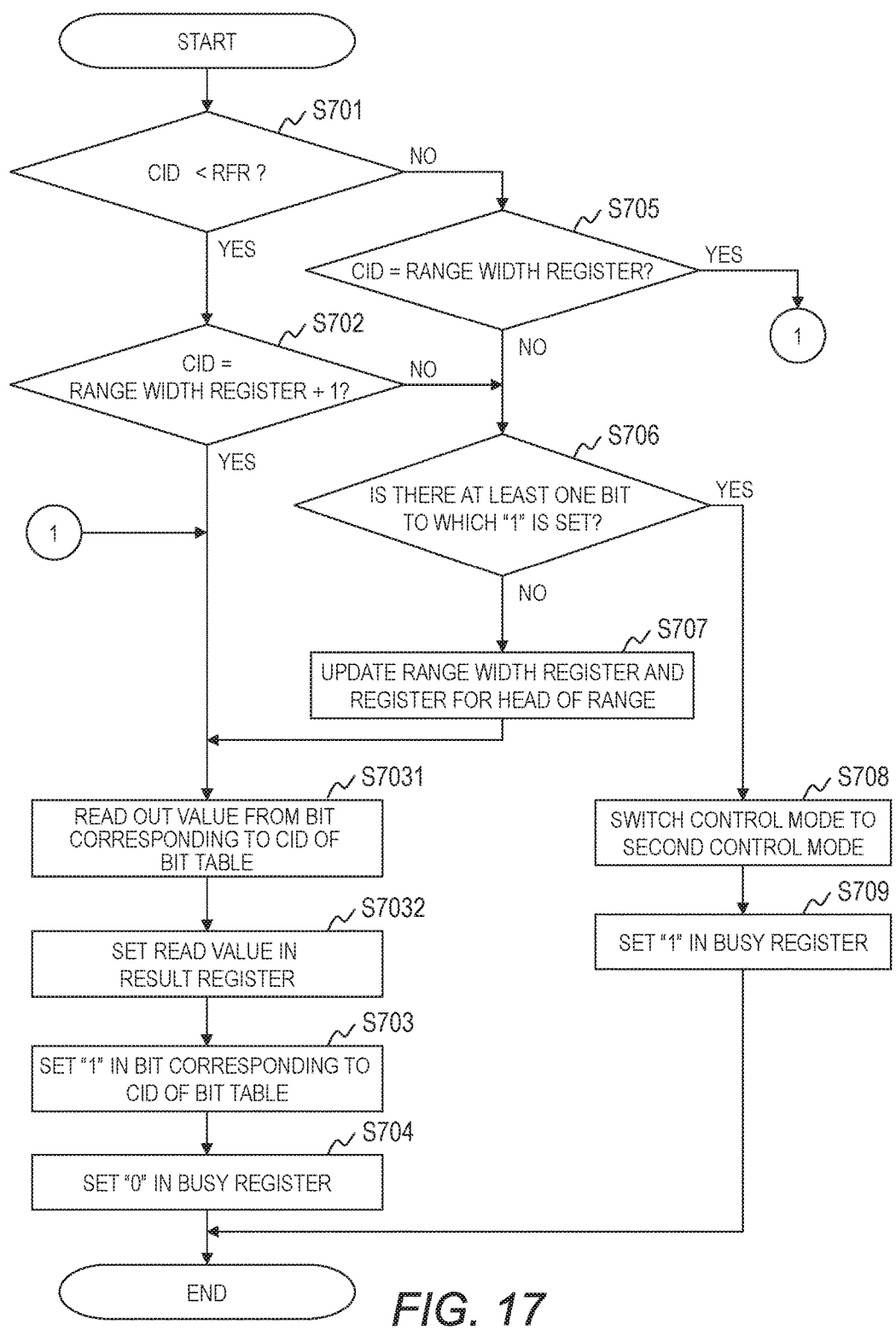
FIG. 17 is a flow chart for explaining a process executed by the collision detection unit according to the second embodiment in a case where the command identifier is set in the set register.

FIG. 17 is a flow chart for explaining a process executed by the collision detection unit 132 according to the second embodiment in a case where the command identifier 501 is set in the set register 610.

The collision detection unit 132 starts a process described below in a case where the collision detection unit 132 detects that the command identifier 501 is set in the set register 610.

First, the collision detection unit 132 determines whether or not the set command identifier 501 is included in the partial CID space by executing the processes of Step S701, Step S702 and Step S705.

The collision detection unit 132 determines whether or not the lower value of the command identifier 501 set in the set register 610 is smaller than the value of the register for head of range 650 (Step S701). To be more specific, a following process will be executed.

In a case of detecting that the command identifier 501 is set in the set register 610, the collision detection unit 132 inputs the command identifier 501 set in the set register 610 to the detection range determination unit 700. Also, the collision detection unit 132 inputs the values set in the range width register 800 and the register for head of range 650 to the detection range determination unit 700.

The detection range determination unit 700 determines whether or not the lower value of the inputted command identifier 501 is smaller than the inputted value of the register for head of range 650. The above is the description of the process of Step S701.

In a case where it is determined that the lower value of the command identifier 501 is smaller than the value of the register for head of range 650, the collision detection unit 132 determines whether or not the upper value of the command identifier 501 matches the value of the range width register 800 with "1" added thereto (Step S702)

The process in Step S702 is a process for determining whether or not the command identifier 501 is included in an area next to the reference area. In a case where the result of the determination in Step S701 is NO and the result of the determination in Step S702 is YES, said command identifier 501 is included in the partial CID space.

This is because in the bit table 670 the first address that is smaller than the value of the register for head of range 650 certainly matches, as illustrated in FIG. 16, the second address in the area next to the reference area.

In a case where it is determined that the upper value of the command identifier 501 does not match the value of the range width register 800 with "1" added thereto, that is, in a case where it is determined that the command identifier 501 is not included in the partial CID space, the collision detection unit 132 proceeds to Step S706.

In a case where it is determined that the upper value of the command identifier 501 matches the value of the range width register 800 with "1" added thereto, that is, in a case where it is determined that the command identifier 501 is included in the partial CID space, the collision detection unit 132 reads out a value in the bit table 670 (Step S7031) and sets the read value in the result register 640 (Step S7032). Also, the collision detection unit 132 updates the bit table 670 (Step S703).

To be more specific, the collision detection unit 132 outputs the first address of the bit that corresponds to the command identifier 501 to the write selector 730. In other words, the collision detection unit 132 inputs the lower value of the command identifier 501. The collision detection unit 132 writes "1" in the bit corresponding to the command identifier 501 by operating the write selector 730.

Next, the detection range determination unit 700 of the collision detection unit 132 writes "0" in the busy register 600 (Step S704). Then, the collision detection unit 132 ends the process.

In a case where it is determined in Step S701 that the lower value of the command identifier 501 is equal to or greater than the value of the register for head of range 650, the collision detection unit 132 determines whether or not the upper value of the command identifier 501 matches the value of the range width register 800 (Step S705).

The process in Step S705 is a process for determining whether or not the command identifier 501 is included in the reference area. In a case where the result of the determination in Step S701 is NO, and the result of the determination in Step S705 is YES, the command identifier 501 is included in the partial CID space.

This is because in the bit table 670 the first address that is equal to or greater than the value of the register for head of range 650 certainly matches, as illustrated in FIG. 16, the second address in the reference area.

In a case where it is determined that the upper value of the command identifier 501 matches the value of the range width register 800, that is, in a case where it is determined that the command identifier 501 is included in the partial CID space, the collision detection unit 132 proceeds to Step S7031.

In a case where it is determined that the upper value of the command identifier 501 does not match the value of the range width register 800, that is, in a case where it is determined that the command identifier 501 is not included in the partial CID space, the collision detection unit 132 proceeds to Step S706.

In a case where the result of the determination in Step S702 is NO, or in a case where the result of the determination in Step S705 is NO, in other words, in a case where it is determined that the command identifier 501 is not included in the partial CID space, the collision detection unit 132 determines whether or not the bit table 670 includes at least one or more bits set as "1" (Step S706).

In a case where it is determined that the bit table 670 include no bit set as "1," the collision detection unit 132 updates the range width register 800 and the register for head of range 650 (Step S707), and then proceeds to Step S7031. The method to update the values of the range width register 800 and the register for head of range 650 may include two methods as below, for example.

(1) First, the command identifier 501 set in the set register 610 is inputted in the update unit 710. The update unit 710 writes the upper value of the inputted command identifier 501 in the range width register 800, and writes the lower value of the inputted command identifier 501 in the register for head of range 650. Note that the values for all bits in the bit table 670 are set as "0."

(2) The command identifier 501 set in the set register 610 is inputted in the update unit 710. The update unit 710 writes the upper value of the inputted 501 in the range width register 800. The update unit 710 sets the value of the register for head of range 650 as "0." At this point, the values for all bits in the bit table 670 are set as "0." Note that the update unit 710 may set the value of the register for head of range 650 to any value other than "0."

In a case where the execution method of the command data 500 is an out of order manner, the update methods (1) and (2) include the following differences there between. The update method (1) is inoperable to detect the collision of newly inputted command identifier 501 in a case where the newly inputted command identifier 501 is smaller than the inputted command identifier 501. Accordingly, the performance of the I/O process may be deteriorated. On the other hand, the update method (2) is operable to detect the collision of adjacent command identifier 501 of the inputted command identifier 501.

The above is the description for the process of Step S707.

In a case where it is determined that the bit table 670 includes a bit that is set as "1" the collision detection unit 132 switches the control mode from the first control mode to the second control mode (Step S708). Also, the detection range determination unit 700 of the collision detection unit 132 writes "1" in the busy register 600 (Step S709). Then, the collision detection unit 132 ends the process.

Figure 18:
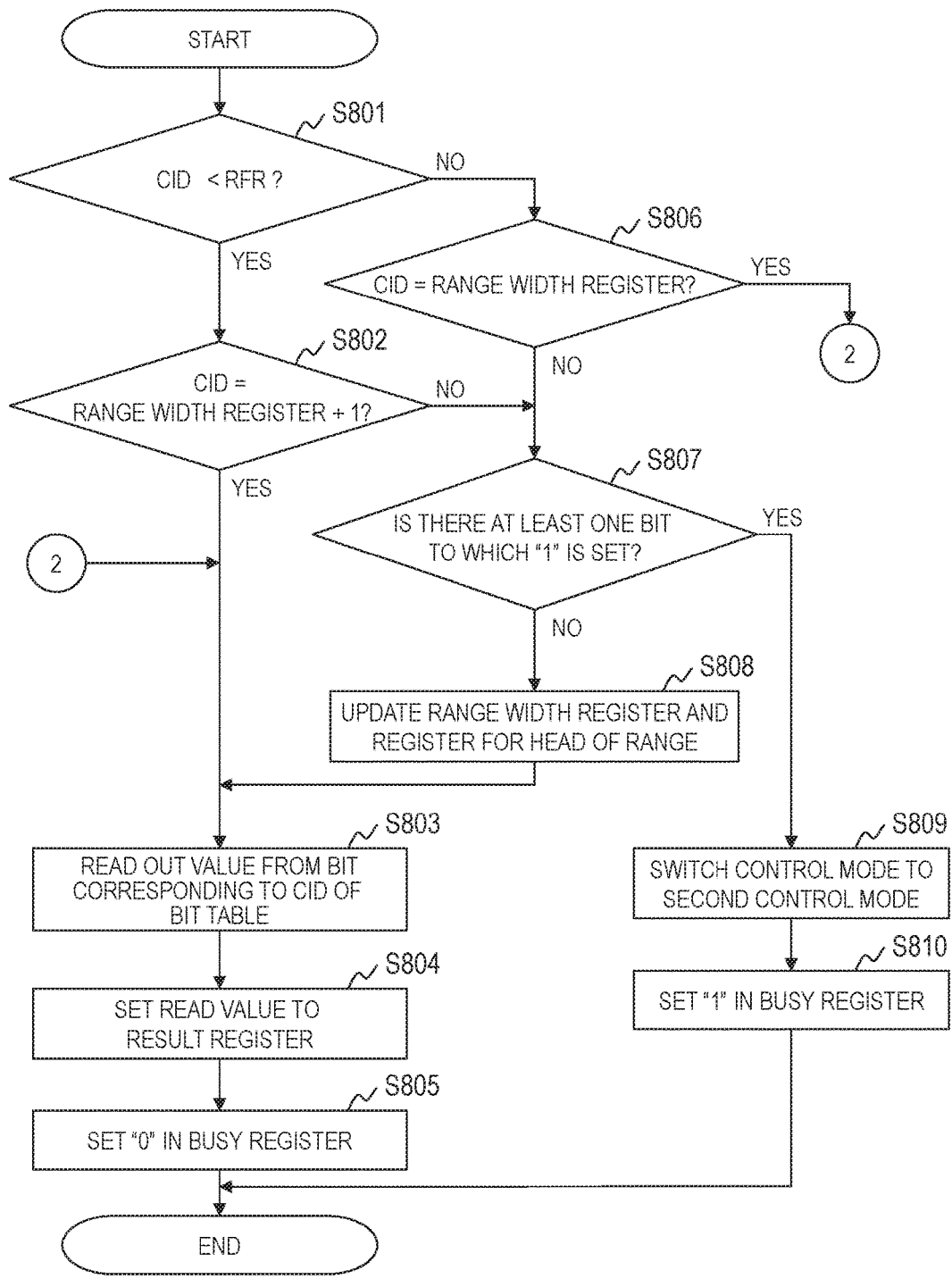
FIG. 18 is a flow chart for explaining a process executed by the collision detection unit according to the second embodiment in a case where the command identifier is set in the check register.

FIG. 18 is a flow chart for explaining a process executed by the collision detection unit 132 according to the second embodiment in a case where the command identifier 501 is set in the check register 630.

The collision detection unit 132 starts a process described below in a case were the collision detection unit 132 detects that the command identifier 501 is set in the check register 630.

Since the processes for Step S801, Step S802 and Step S805 through Step S810 are the same as those for Step S701, Step S702 and Step S704 through Step S709, their descriptions will be omitted.

In Step S803, the collision detection unit 132 refers to the bit table 670 and reads out a value from a bit that corresponds to the command identifier 501 that is set.

To be more specific, the collision detection unit 132 outputs the lower value of the command identifier 501 to the read selector 740. The lower value of the command identifier 501 matches the first address. The collision detection unit 132 reads out the value of a bit that corresponds to the set command identifier 501 by operating the read selector 740.

The collision detection unit 132 sets the value read out in Step S803 in the result register 640 (Step S804), and then proceeds to Step S805.

Figure 19A:
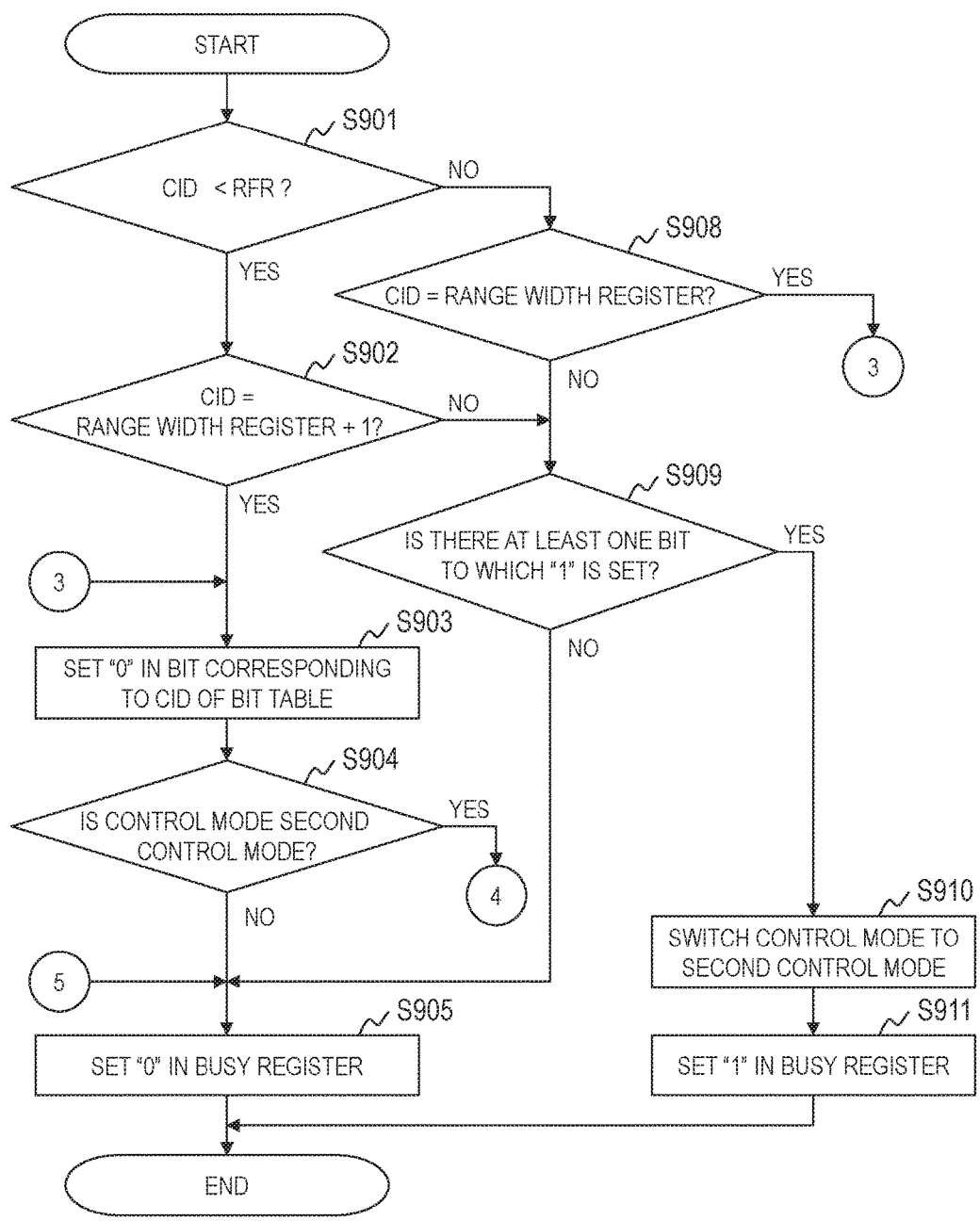
FIG. 19A and FIG. 19B each are flow chart for explaining a process executed by the collision detection unit according to the second embodiment in a case where the command identifier is set in the clear register.
Figure 19B:
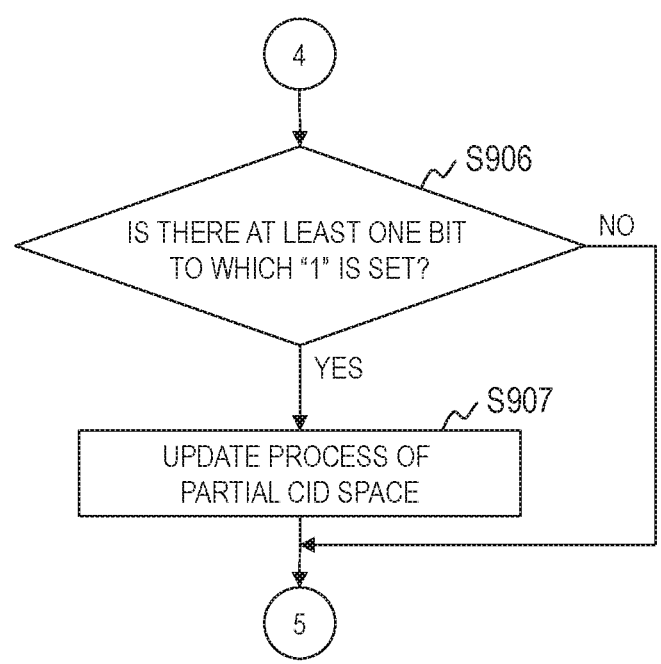

FIG. 19A and FIG. 19B each are flow chart for explaining a process executed by the collision detection unit 132 according to the second embodiment in a case where the command identifier 501 is set in the clear register 620.

The collision detection unit 132 starts a process described below in a case where the collision detection unit 132 detects that the command identifier 501 is set in the check register 620.

Since the processes for Step S901, Step S902, Step S905, Step S908, Step S909, Step S910 and Step S911 are the same as those for Step S701, Step S702, Step S704, Step S705, Step S706, Step S708 and Step S709, their descriptions will be omitted.

In a case where the result of the determination in Step S902 is YES, or in a case where the result of the determination in Step S908 is YES, the collision detection unit 132 updates the bit table 670 (Step S903).

To be more specific, the collision detection unit 132 outputs the lower value of the command identifier 501 to the write selector 730. The lower value of the command identifier 501 matches the first address. The collision detection unit 132 writes "0" in the bit corresponding to the command identifier 501 by operating the write selector 730.

The collision detection unit 132 determines whether or not the control mode is the second control mode (Step S904).

In a case where it is determined that the control mode is not the second control mode, the collision detection unit 132 writes "0" in the busy register 600 (Step S905). Then the collision detection unit 132 ends the process.

In a case where it is determined that the control mode is the second control mode, the collision detection unit 132 determines whether or not the bit table 670 includes at least one or more bits set as "1" (Step S906).

In a case where it is determined that the bit table 670 includes no bit set as "1," the collision detection unit 132 proceeds to Step S905.

In a case where it is determined that the bit table 670 includes a bit that is set as "1," the collision detection unit 132 executes the update process of the partial CID space (Step S907), and then proceeds to Step S905. By this, the position of the partial CID space within the CID space changes. To be more specific, a following process will be executed.

The collision detection unit 132 refers to the bit table 670 based on the value set in the register for head of range 650, and determines whether or not the value of a bit that corresponds to the command identifier 501 that is the head of the partial CID space is "0."

In a case where it is determined that the value of a bit that corresponds to the command identifier 501 that is the head of the partial CID space is not "0," the collision detection unit 132 ends the update process.

In a case where it is determined that the value of a bit that corresponds to the command identifier 501 that is the head of the partial CID space is "0," the collision detection unit 132 refers to the value of a bit whose address is set next largest to the first address of the bit that corresponds to the command identifier 501 that is the head of the partial CID space, and retrieves a bit whose value is set as "1."

The collision detection unit 132 adds "1" to the value of the range width register 800 and further sets the value of the register for head of range 650 as "0," in a case where the collision detection unit 132 is unable, after searching to the right end of the bit table 670, to retrieve a bit whose address is set as "$2^N-1$," that is, a bit whose value is set as "1." The collision detection unit 132 refers to the value of a bit whose position is "0," that is, the collision detection unit 132 refers to the value of a bit starting from the left end of the bit table 670 to the right to retrieve a bit whose value is set as "1."

In a case where the collision detection unit 132 is able to retrieve a bit whose value is set as "1," the collision detection unit 132 writes the first address of the bit in the register for head of range 650. The above is the description for the process of Step S907.

Here, the update process of the partial CID space will be described with reference to a specific example. FIG. 20A, FIG. 20B, FIG. 20C and FIG. 20D each are explanatory diagram illustrating a state of the range width register 800, the register for head of range 650 and the bit table 670 for an update process of the partial CID space according to the second embodiment.

Figure 20A:
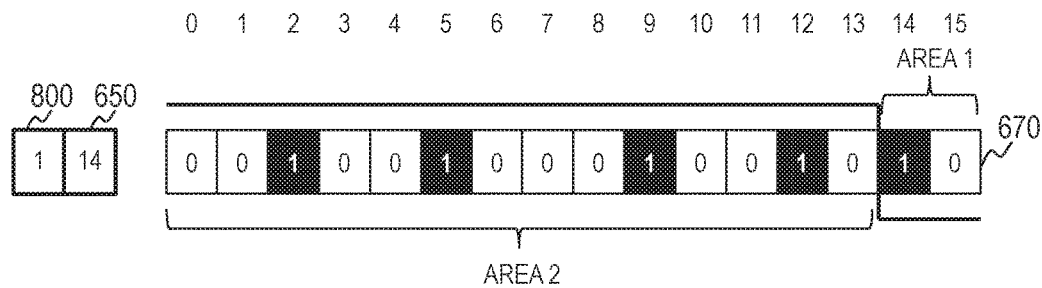
FIG. 20A, FIG. 20B, FIG. 20C and FIG. 20D each are explanatory diagram illustrating a state of the range width register, the register for head of range and the bit table for an update process of the partial CID space according to the second embodiment.

Note that in the description below the control mode of the collision detection unit 132 is the second control mode. Also, note that the state of the bit table 670 before the execution of the update process of the partial CID space is as illustrated in FIG. 20A. At this point, "1" is set in the range width register 800, while "14" is set in the register for head of range 650.

In a case where the command identifier 501 that corresponds to the second address "14" in area 1 is set in the clear register 620, the collision detection unit 132 writes "0" on the bit in the bit table 670 whose first address is "14" (Step S903). At this point, the bit table 670 is in the state as illustrated in FIG. 20B.

In Step S904, the collision detection unit 132 determines that the control mode is the second control mode. Also, in Step S906, the collision detection unit 132 determines that the bit table 670 includes a bit set as "1." In Step S907, the collision detection unit 132 executes a following process.

The collision detection unit 132 determines that the value of the bit that corresponds to the command identifier 501 that is the head of the partial CID space is "0," that is, the bit whose first address is "14" is "0."

Figure 20B:
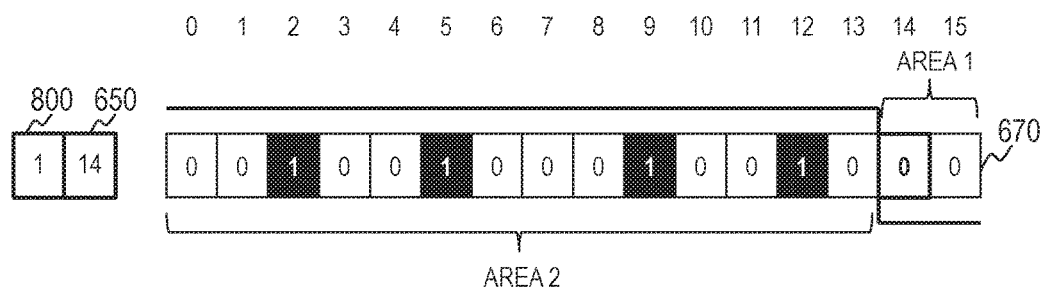

The collision detection unit 132 rewrites the value of head of range 650 as "15," and determines whether or not the value of the bit whose first address is "15" is "0." According to the example illustrated in FIG. 20B, the collision detection unit 132 determines that the value of the bit whose first address is "15" is "0."

Figure 20C:
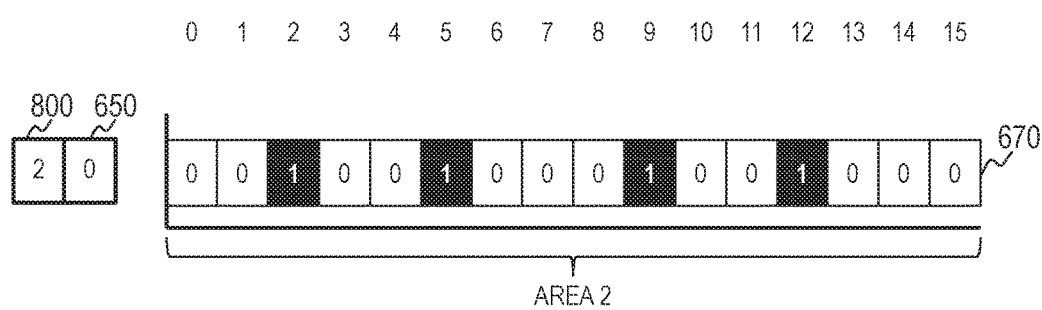

The collision detection unit 132 is unable to find a bit set as "1" despite the search up to the first address of "$2^N-1$" in the bit table 670, that is, the collision detection unit 132 is unable to find a bit set as "1" despite the search up to the first address of "15." Accordingly, the collision detection unit 132 writes the value of the range width register 800 as "2," and further sets the value of the register for head of range 650 as "0." By this, the bit table 670, the range width register 800 and the register for head of range 650 will be as illustrated in FIG. 20C.

Figure 20D:
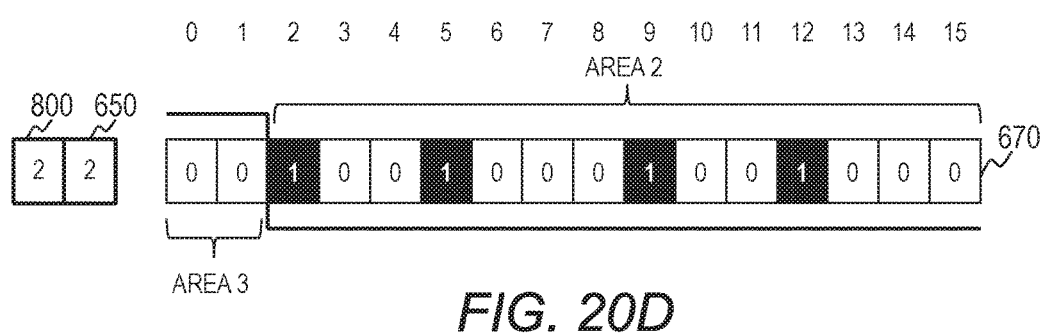

The collision detection unit 132 executes a similar search process, and learns that the value of the bit whose first address is "2" is "1." Accordingly, the collision detection unit 132 ends the search process. At this point, the bit table 670, the range width register 800 and the register for head of range 650 will be as illustrated in FIG. 20D.

The process described above enables the shift of the partial CID space as illustrated in FIG. 13.

According to the second embodiment, operating the range width register 800 and the register for head of range 650 enables the shift of the partial CID space. The collision detection unit 132 of the second embodiment is, compared to the collision detection unit 132 of first embodiment, operable to achieve reduced register and logic circuit, and eliminate the need to execute the shift processing of the bit table 670. Accordingly, it becomes possible to reduce the size of the circuit of the collision detection unit 132, while significantly reducing power consumption.

Note that while the collision detection unit 132 used the first control mode during the initial state in both first embodiment and the second embodiment, the present invention is not limited thereto. For example, the collision detection unit 132 in the initial state may use the second control mode. Such control mode is effective in particular for a system in which identifiers that belong to a command identifier space are configured in advance to be assigned in an order.

In such case, it becomes possible to omit the process to switch the control modes. For example, the processes for Step S405, Step S407, Step S408, Step S502, Step S506, Step S507, Step S608, Step S609, Step S706, Step S708, Step S709, Step S807, Step S809 and Step S810, or the like, may be omitted.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer coupled to an external apparatus via an I/O device comprising,
a control unit configured to assign a command identifier to a command issued to the external apparatus,
wherein the I/O device includes a collision detection unit that defines a partial command identifier space which is a subspace of a command identifier space, the command identifier space is a set of a plurality of command identifiers, and
wherein the collision detection unit is configured to:
shift an arrangement of the partial command identifier space within the command identifier space; and
determine whether or not the assigned command identifier collides with another command identifier that is in use.

2. A computer system comprising at least one first computer and at least one second computer coupled to the at least one first computer,
wherein the at least one first computer executes a task,
wherein the at least one second computer provides a storage area for the at least one first computer to use,
wherein the at least one first computer is coupled to the at least one second computer via an I/O device,
wherein the at least one first computer includes a control unit configured to assign a commend identifier to a command issued to the at least one second computer,
wherein the I/O device includes a collision detection unit that defines a partial command identifier space which is a subspace of command identifier space, the command identifier space is a set of a plurality of command identifiers, and
wherein the collision detection unit is configured to:
shift an arrangement of the partial command identifier space within the command identifier space, and
determine whether or not the assigned command identifier collides with another command identifier that is in use.

* * * * *